(12) United States Patent
Stotler

(10) Patent No.: US 10,037,052 B2
(45) Date of Patent: Jul. 31, 2018

(54) FINGER-WEARABLE DEVICES AND ASSOCIATED SYSTEMS

(71) Applicant: Smart Patents LLC, Milwaukie, OR (US)

(72) Inventor: James G. Stotler, Milwaukie, OR (US)

(73) Assignee: Smart Patents LLC, Milwaukie, OR (US)

( * ) Notice: Subject to any disclaimer, the term of this patent is extended or adjusted under 35 U.S.C. 154(b) by 0 days.

(21) Appl. No.: 15/481,759

(22) Filed: Apr. 7, 2017

(65) Prior Publication Data

US 2017/0212552 A1   Jul. 27, 2017

Related U.S. Application Data

(63) Continuation of application No. 14/590,867, filed on Jan. 6, 2015, now Pat. No. 9,651,992, which is a
(Continued)

(51) Int. Cl.
*G09G 5/00* (2006.01)
*G06F 1/16* (2006.01)
(Continued)

(52) U.S. Cl.
CPC ............ *G06F 1/163* (2013.01); *A44C 9/0053* (2013.01); *A44C 9/02* (2013.01); *G06F 1/165* (2013.01);
(Continued)

(58) Field of Classification Search
CPC ........ G06F 1/163; G06F 3/014; G06F 1/1626; G06F 1/1637; G06F 1/1643; G06F 1/165;
(Continued)

(56) References Cited

U.S. PATENT DOCUMENTS

| 4,954,817 A | 9/1990 | Levine |
| 5,481,265 A | 1/1996 | Russell |

(Continued)

FOREIGN PATENT DOCUMENTS

| CN | 201331676 Y | 10/2009 |
| JP | 2006-302204 A | 11/2006 |

(Continued)

OTHER PUBLICATIONS

PCT International Search Report and Written Opinion of the International Searching Authority dated Oct. 21, 2014, Application No. PCT/US14/30799, 20 pages.
(Continued)

*Primary Examiner* — Rodney Amadiz
(74) *Attorney, Agent, or Firm* — Dascenzo Intellectual Property Law, P.C.

(57) ABSTRACT

A finger-wearable computing device may comprise a processor, a ring base, and a display screen. The display screen is coupled to the ring base and coupled to the processor to display an output. The display screen includes a command area configured to receive user input from a wearer's thumb while the finger-wearable computing device is worn on a wearer's finger. The ring base may be resiliently flexible and may define an overlapping loop with a central opening that expands and contracts to fit the wearer's finger. The display screen may be flexibly coupled to the ring base and may have a vertical axis that is canted at an angle relative to a central axis of the ring base to ergonomically position the display screen while the wearable computing device is worn on the finger of the wearer's hand.

23 Claims, 12 Drawing Sheets

Related U.S. Application Data continuation of application No. PCT/US2014/030799, filed on Mar. 17, 2014.

(60) Provisional application No. 61/800,950, filed on Mar. 15, 2013.

(51) Int. Cl.

| | | |
|---|---|---|
| *G06F 3/01* | (2006.01) | |
| *A44C 9/02* | (2006.01) | |
| *A44C 9/00* | (2006.01) | |
| *G06F 3/0354* | (2013.01) | |
| *G06F 15/02* | (2006.01) | |
| *H04M 1/725* | (2006.01) | |
| *G06F 3/039* | (2013.01) | |

(52) U.S. Cl.
CPC .......... *G06F 1/1626* (2013.01); *G06F 1/1637* (2013.01); *G06F 1/1643* (2013.01); *G06F 1/1684* (2013.01); *G06F 1/1692* (2013.01); *G06F 3/014* (2013.01); *G06F 3/03547* (2013.01); *G06F 15/0216* (2013.01); *H04M 1/7255* (2013.01); *H04M 1/72547* (2013.01); *H04M 1/72552* (2013.01); *H04M 1/72555* (2013.01); *G06F 3/039* (2013.01)

(58) Field of Classification Search
CPC .............. G06F 1/1692; G06F 3/03547; G06F 15/0216; G06F 1/1684; G06F 3/039; A44C 9/02; A44C 9/0053; H04M 1/72555; H04M 1/72547; H04M 1/7255; H04M 1/72552
See application file for complete search history.

(56) References Cited

U.S. PATENT DOCUMENTS

| | | | |
|---|---|---|---|
| 5,514,861 A | 5/1996 | Swartz et al. | |
| 5,832,296 A * | 11/1998 | Wang | G06F 3/0338 340/12.53 |
| 5,857,217 A | 1/1999 | Hsueh | |
| 5,964,701 A | 10/1999 | Asada et al. | |
| 6,297,808 B1 | 10/2001 | Yang | |
| 6,447,457 B1 | 9/2002 | Forstner et al. | |
| 6,757,390 B2 | 6/2004 | Ito et al. | |
| 6,778,380 B2 | 8/2004 | Murray, Jr. | |
| D574,496 S | 8/2008 | Kitamura et al. | |
| 7,578,070 B1 | 8/2009 | Lynch | |
| D617,672 S | 6/2010 | Sandberg | |
| 8,009,422 B2 | 8/2011 | Misawa | |
| 8,243,050 B2 | 8/2012 | Adkiins | |
| 8,243,961 B1 | 8/2012 | Morrill | |
| D673,953 S | 1/2013 | Li et al. | |
| D673,954 S | 1/2013 | Li et al. | |
| 8,570,273 B1 | 10/2013 | Smith | |
| 8,605,036 B1 | 12/2013 | Kelly | |
| 8,712,393 B2 | 4/2014 | Kim et al. | |
| D726,139 S | 4/2015 | Park et al. | |
| 9,740,906 B2 * | 8/2017 | AlNasser | G06K 7/10891 |
| 9,786,247 B2 * | 10/2017 | Hong | G09G 5/003 |
| 2002/0019296 A1 | 2/2002 | Freeman et al. | |
| 2004/0190383 A1 * | 9/2004 | Marcucelli | G04B 37/1433 368/278 |
| 2004/0196265 A1 | 10/2004 | Nohr | |
| 2006/0001646 A1 | 1/2006 | Hai | |
| 2006/0164383 A1 * | 7/2006 | Machin | G05G 9/047 345/156 |
| 2006/0209218 A1 | 9/2006 | Lee et al. | |
| 2006/0274052 A1 | 12/2006 | Lo et al. | |
| 2007/0035518 A1 | 2/2007 | Francz et al. | |
| 2007/0213620 A1 | 9/2007 | Reisfeld | |
| 2007/0262958 A1 | 11/2007 | Cai et al. | |
| 2008/0094561 A1 | 4/2008 | Fan et al. | |
| 2008/0146289 A1 | 6/2008 | Korneluk et al. | |
| 2008/0291225 A1 | 11/2008 | Arneson | |
| 2009/0126243 A1 | 5/2009 | Schellingerhout et al. | |
| 2009/0133499 A1 | 5/2009 | Cato | |
| 2009/0156272 A1 | 6/2009 | Ohuchi et al. | |
| 2009/0251888 A1 * | 10/2009 | Douglas | A44C 5/0015 362/103 |
| 2009/0298554 A1 | 12/2009 | Kim et al. | |
| 2010/0029327 A1 | 2/2010 | Jee | |
| 2010/0117975 A1 | 5/2010 | Cho | |
| 2010/0168531 A1 | 7/2010 | Shaltis et al. | |
| 2010/0201929 A1 | 8/2010 | Okada et al. | |
| 2010/0298677 A1 | 11/2010 | Lu et al. | |
| 2011/0090148 A1 | 4/2011 | Li et al. | |
| 2011/0182151 A1 | 7/2011 | Geyer et al. | |
| 2011/0224564 A1 | 9/2011 | Moon et al. | |
| 2011/0266316 A1 * | 11/2011 | Ghalib | A45F 5/00 224/217 |
| 2012/0050164 A1 | 3/2012 | Martel | |
| 2012/0077480 A1 | 3/2012 | DeLuca | |
| 2012/0130203 A1 | 5/2012 | Stergiou et al. | |
| 2012/0234044 A1 | 9/2012 | Matysik | |
| 2012/0258823 A1 | 10/2012 | Desender | |
| 2012/0293410 A1 | 11/2012 | Bell | |
| 2013/0044215 A1 | 2/2013 | Rothkopf et al. | |
| 2013/0127980 A1 * | 5/2013 | Haddick | G06F 3/013 348/14.08 |
| 2013/0135223 A1 * | 5/2013 | Shai | G06F 3/014 345/173 |
| 2013/0146625 A1 | 6/2013 | Karle et al. | |
| 2013/0260822 A1 | 10/2013 | Wu | |
| 2014/0160055 A1 | 6/2014 | Margolis et al. | |
| 2014/0221048 A1 | 8/2014 | Kumor | |
| 2014/0337621 A1 * | 11/2014 | Nakhimov | G06F 1/163 713/168 |
| 2015/0277559 A1 * | 10/2015 | Vescovi | G06F 3/014 345/173 |

FOREIGN PATENT DOCUMENTS

| | | | |
|---|---|---|---|
| WO | WO 1997/42560 A1 | 11/1997 | |
| WO | WO 2005091087 A1 * | 9/2005 | .......... G04G 17/083 |
| WO | WO 2008/130089 A1 | 10/2008 | |

OTHER PUBLICATIONS iPhone User Guide for iOS 4.2 and 4.3 Software, Apple Inc., 2011, accompanied PCT International Search Report and Written Opinion of the International Searching Authority dated Oct. 21, 2014, Application No. PCT/US14/30799, 274 pages.

Nintendo 3DS, Operations Manual, Nintendo, 2011[retrieved Jan. 5, 2015], accompanied PCT International Search Report and Written Opinion of the International Searching Authority dated Oct. 21, 2014, Application No. PCT/US14/30799, 52 pages.

Motorola Razr V3i GSM, Motorola Inc., 2006, accompanied PCT International Search Report and Written Opinion of the International Searching Authority dated Oct. 21, 2014, Application No. PCT/US14/30799, 112 pages.

English language abstract of China Patent No. CN 201331676Y, European Patent Office, dated Oct. 21, 2009.

English language machine translation of China Patent No. CN 201331676Y, European Patent Office, dated Oct. 21, 2009.

* cited by examiner

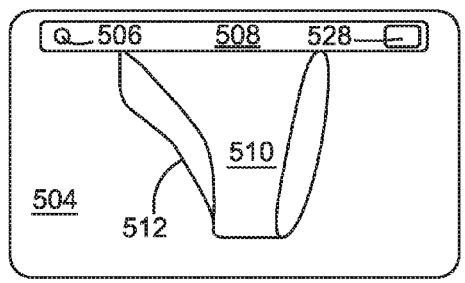
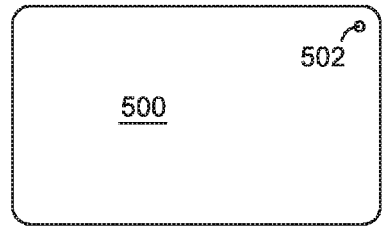
Fig. 5B    Fig. 5A
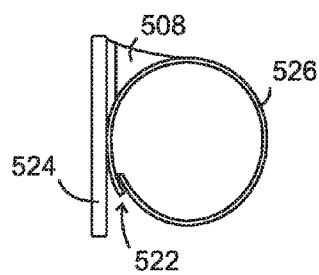
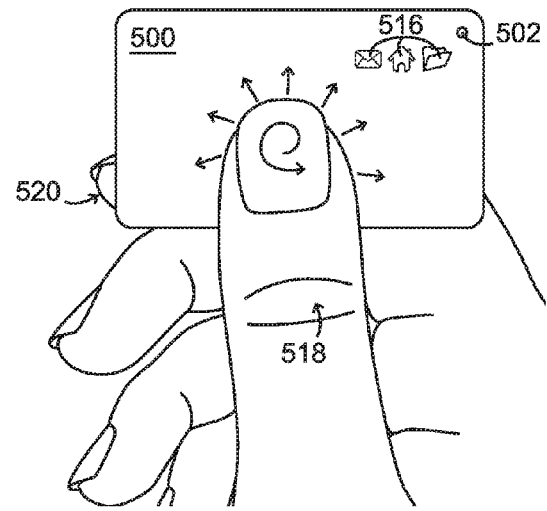
Fig. 5C
Fig. 5
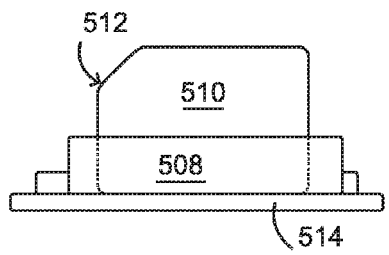
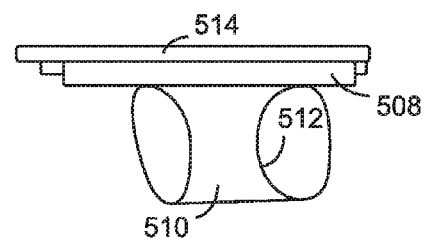
Fig. 5D    Fig. 5E

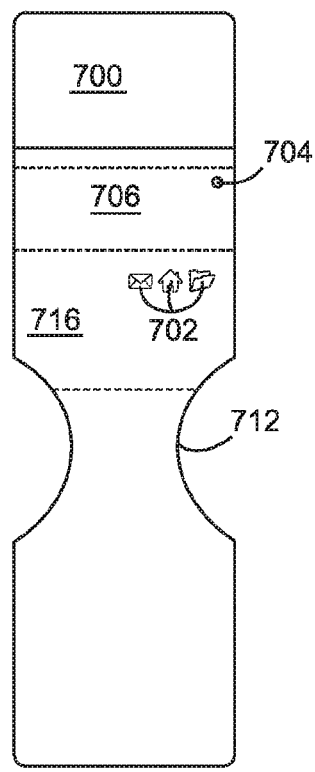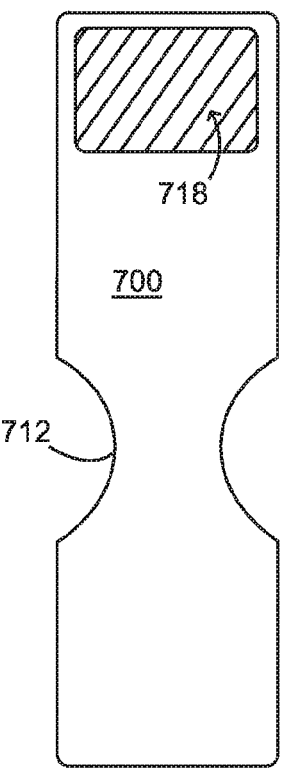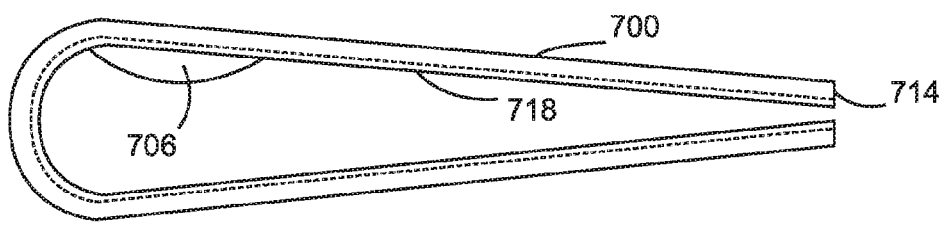

FINGER-WEARABLE DEVICES AND ASSOCIATED SYSTEMS

RELATED APPLICATIONS

This continuation patent application claims benefit of and priority to co-pending U.S. patent application Ser. No. 14/590,867, filed Jan. 6, 2015, which is a continuation patent application of International Patent Application No. PCT/US14/30799, filed Mar. 17, 2014, which is a non-provisional patent application claiming benefit of and priority to U.S. Patent Application No. 61/800,950, filed Mar. 15, 2013, the contents of which patent applications are hereby incorporated by reference as if recited in full herein for all purposes.

FIELD

This application pertains to mobile electronic devices, for example, commonly known to as, Personal Electronic Devices (sometimes referred to in the art as P.E.D.s), e.g. with Smart Phones being but one of many possible examples, and more particularly but not exclusively to wearable, interface apparatus.

BACKGROUND

This section is intended to introduce the reader to various aspects of art that may be related to various aspects of the present disclosure, which are described or claimed below. This discussion is believed to be helpful in providing the reader with background information to facilitate a better understanding of the various aspects of the present disclosure. Accordingly, it should be understood that these statements are to be read in this light, and not as admissions of prior art.

Recent advances in portable, mobile computing include the introduction of hand held electronic devices for computing and communicating globally. These platforms are known generally as Smart Phones. Such devices can be used for any number of tasks and functions including cell phone conversations, voice and written work communications, texting, e-mail, social media networking, video conferencing, gaming, a myriad of communication connections through the World Wide Web, the Internet, etc.

Although these types of devices allows an extensive variety of tasks to be performed, the overall functionality and hand-ability of these device types still has room for improvement. For example, currently most Smart Phone devices are thin, rectangular with a touch screen on the front, camera and flash on back with switching controls, microphone and speaker, jacks and plug-ins, etc. on/or about the outside edges. Additional computing components of the hand-held device e.g., processor(s), memory chip(s), batteries, antenna and the like can be encased internally inside the device's frame. These designs generally require the use of two hands to operate, one to hold the device, the other to input on the device, thus making the device(s) less functional, less portable, less ergonomic than if such devices could be operated with a single hand.

Many users utilize these devices as their primary means of communication with the outside world and carry such devices with them constantly. Such users commonly depend on their device for a multitude of functions such as cellular phone service, e-mail, blogs, video conferencing, calendar functions, a multitude of apps, usability, book reading, news interaction, movies, music players, TV, chat-rooms, And the like. Capabilities, functions and features available through these types of devices are expanding in complexity and utility daily but the usefulness for the user is generally tied and restricted to user's mental and physical acceptance of their user interface experience, the human touch and feel of interface system, the user access to and from the mass volume of information and features these devices can provide, can be overwhelming. As a result, users are faced with increasingly complex systems and interfaces that lack the ability with which to manage multiple sources of presented information. The user interface must present this volume and variety of sourced information in an efficient, consistent managed manor through an interface that is simple, compact, portable, light-weight, personal, adaptable to user(s) individual needs and desires. In today's environment there are many designs and methods for interface inputting user instructions and performing operations in and with a computer system. Users can become frustrated when they are unable to use their mobile device, quickly and conveniently. Users need a fast responding, easy to maneuver, customizable interface control, capable of single hand use and portability. Wearable, for efficient portability, user alignment of viewing screen(s), that have adjust-ability, have a multi-functional base platform stand. A device that can be multi-functional, that can act as universal remote controller of other capable user selected electronic devices.

At the current time users have no effective way of managing the multiplicity of available data types and information sources through a device designed for single hand use. It is difficult both to conduct two or more different types of computing activities at the same time or to monitor two are more different information sources simultaneously because the user interface tools available are confusing, inflexible, and/or otherwise difficult to implement. The current art lacks marker tracking and touch point technology for controlling PEDs.

Keyboards

Keyboards have been the most common input means to interact with a hand held device. Type Writer, style keyboards with physical keys for a user to press down on are currently becoming obsolete in P.E.D's, as touch screen types have changed the paradigm of user interaction. Most user touch screens have no physical keyboards. Instead, the user interacts with a software-generated soft keyboard display on the screen. The software registers touch and infers keystrokes based on signals received and processed by internal based operating systems. Additional, smart-phone users can input, instruction command and operate through the soft touch input, maneuvers of user's finger type styles, type means to direct screen icons, tiles, apps, etc. as a user desires. With these devices the user's fingers/thumbs are used to select and command on screen icons visually covers up the icon and or touch-point trying to be located, selected and or maneuvered, thus complicating the user interface exchange experience.

SUMMARY

The following presents a simplified summary in order to provide a basic understanding of one or more aspects of the subject matter presently disclosed. The principles disclosed herein can be implemented in numerous ways, including as a method, a system, device, or apparatus (including computer readable media).

According to a first aspect, this application discloses devices compatible with single hand operation and methods and systems for expanding the functionality of same. Some devices permit or provide user self-monitoring capabilities and remote control over additional capable, electronic devices.

Some disclosed devices include an adjustable wearable ring-type holder base, with computer interface track pad. Methods and means for operation thereof are also described. Also disclosed are an optical/detection system to additionally detect, marker(s), on or about user's thumb(s)/finger(s) as they appear on or over the interfaces designated, track pad, field area that may mimic actions on display screen(s).

Some devices can offer simplicity of use, transport, a user interface that facilitates single hand operation in retrieving, sorting, manipulating and viewing multiple data sources and methods corresponding to a user's needs and interests. A wearable finger ring type holder can provide the user a steady and secure base for the interface that further provides an environment in which a user can access, operate, and/or control multiple date sources operating through electronic devices.

Some structures for and methods of using a human interface to a computing environment can promote user control over the device primarily controlled by user thumb (s), a thumb track pad control area is included (attachable) to allow user to manipulate a direct response cursor and/or to command and control information presented on display screen(s) to select source of accessed information and to manage multiple streams of content. For example, some embodiments of disclosed devices present video clips, movies, e-mail messages, TV shows and content, internet sites, data files, application (apps), live video communication streaming, music and a multitude of other forms of information, media or signals, including a plurality of data streams, digital data and electronically stored and retrievable forms of data transfer communication(s).

Disclosed hardware, software and methods can employ and/or allow the user to assess and explore the internet assets while using one hand, leaving the opposite hand free, available for other functions.

The following disclosure further describes many embodiments that relate to methods, apparatus, and devices for hand held and wearable computing, with interface that extends and improves the functionality of user interface elements thereof.

According to other aspects, the present disclosure pertains to apparatus, systems and methods for a wearable electronic device with user input device(s) and may have attached and/or attachable display screens that may include touch sensitive inputting. In some embodiments, disclosed devices may have touch-sensitive display screen(s) with a graphical user interface (GUI), one or more processors, memory and one or more modules and sets of internal instructions stored in memory to allow multiple performance of functions.

Wearable, portable and simple, single-hand operable devices are disclosed. Such a device can have a holder configured as a table top stand in one orientation and can be adjusted and folded flat on the back of the device so the device can be stored in, for example, a pocket. A device with an interface that allows multiple means of inputting and reacts to user control in a faster more intuitive way. An interface that can control additionally capable equipped devices, a device that can detect, read and provide user self-monitoring information, a device that can read card magnetic strips and promote to processing thereof.

Currently hand held devices routinely get dropped, sat on, set-down, lost, forgotten and can easily become stolen. Additionally hand held device, while being carried occupy the full use of one of the user's hands rendering it unusable for other tasks. With the benefit of the ring-type platform base, of this disclosure, including, wearable technology, ease of transport, device stays with the user, readily available for immediate use, and allows faster, easier inputting for more refined display screen manipulations.

Other innovative aspects of this disclosure will become readily apparent to those having ordinary skill in the art from a careful review of the following detailed description (and accompanying drawings), wherein various embodiments of disclosed innovations are shown and described by way of illustration. As will be realized, other and different embodiments of modules and systems incorporating the disclosed innovations are possible and several disclosed details are capable of being modified in various respects, all without departing from the spirit and scope of the principles disclosed herein. For example, the detailed description set forth below in connection with the appended drawings is intended to describe various embodiments of the disclosed innovations and is not intended to represent the only embodiments contemplated by the inventor. Instead, the detailed description includes specific details for the purpose of providing a comprehensive understanding of the principles disclosed herein. Accordingly the drawings and detailed description are to be regarded as illustrative in nature and not as restrictive.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

Referring to the drawings, wherein like reference numerals indicate similar parts throughout the several views, several examples of systems incorporating aspects of the presently disclosed principles are illustrated by way of example, and not by way of limitation.

FIG. 5 is a right-side perspective front view illustration showing exterior of example #5 embodiment of construction demonstrating, example user thumb movement over/on active track pad display screen area.

FIG. 5A is a front view illustration showing exterior of example #5 embodiment of construction, user interface track pad screen.

FIG. 5B is a back view illustration showing exterior of example #5 embodiment of construction.

FIG. 5C Is a left-side view illustration showing exterior of example #5 embodiment of construction, additionally demonstrating the ring type base holder with overlap expansion area.

FIG. 5D is a top view illustration showing exterior of example #5 embodiment of construction.

FIG. 5E is a bottom view illustration showing exterior of example #5 embodiment of construction.

FIGS. 7F and 7G are plan elevation views showing respective exterior features of the example #7 embodiment of construction, demonstrating a portion of the shape responsive flexible display in a demonstrative alternative open position.

FIG. 7H is a side end view illustration showing exterior of example #7 embodiment of construction, demonstrating a portion of the shape responsive flexible display in an alternative optional closed position.

LIST OF ILLUSTRATION ANNOTATION REFERENCE NUMERALS

Figure 1:
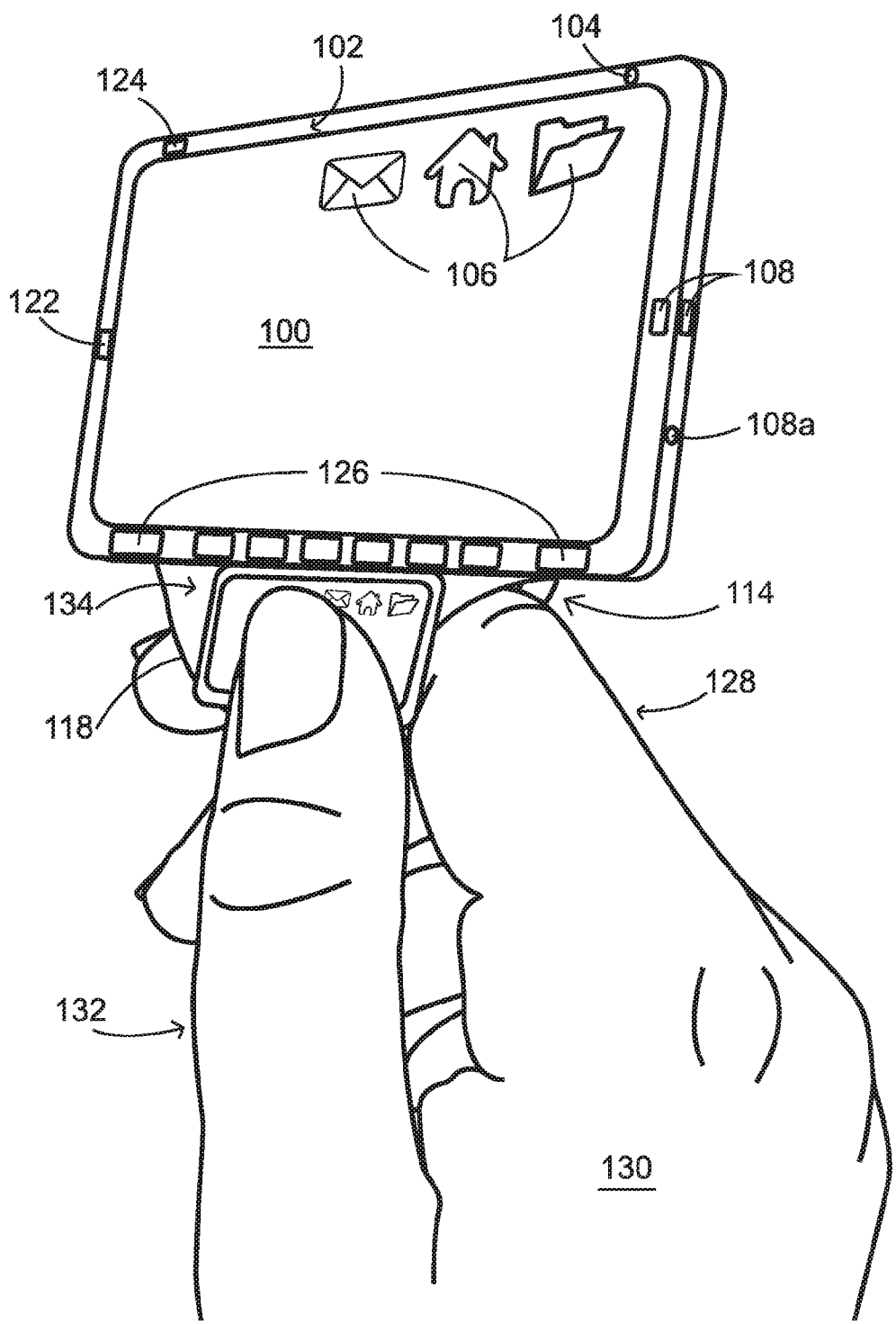
FIG. 1 is a perspective right-front angled view showing exterior of example #1 embodiment of construction, demonstrated being worn, illustrated on index finger of an example user hand.
Figure 1A:
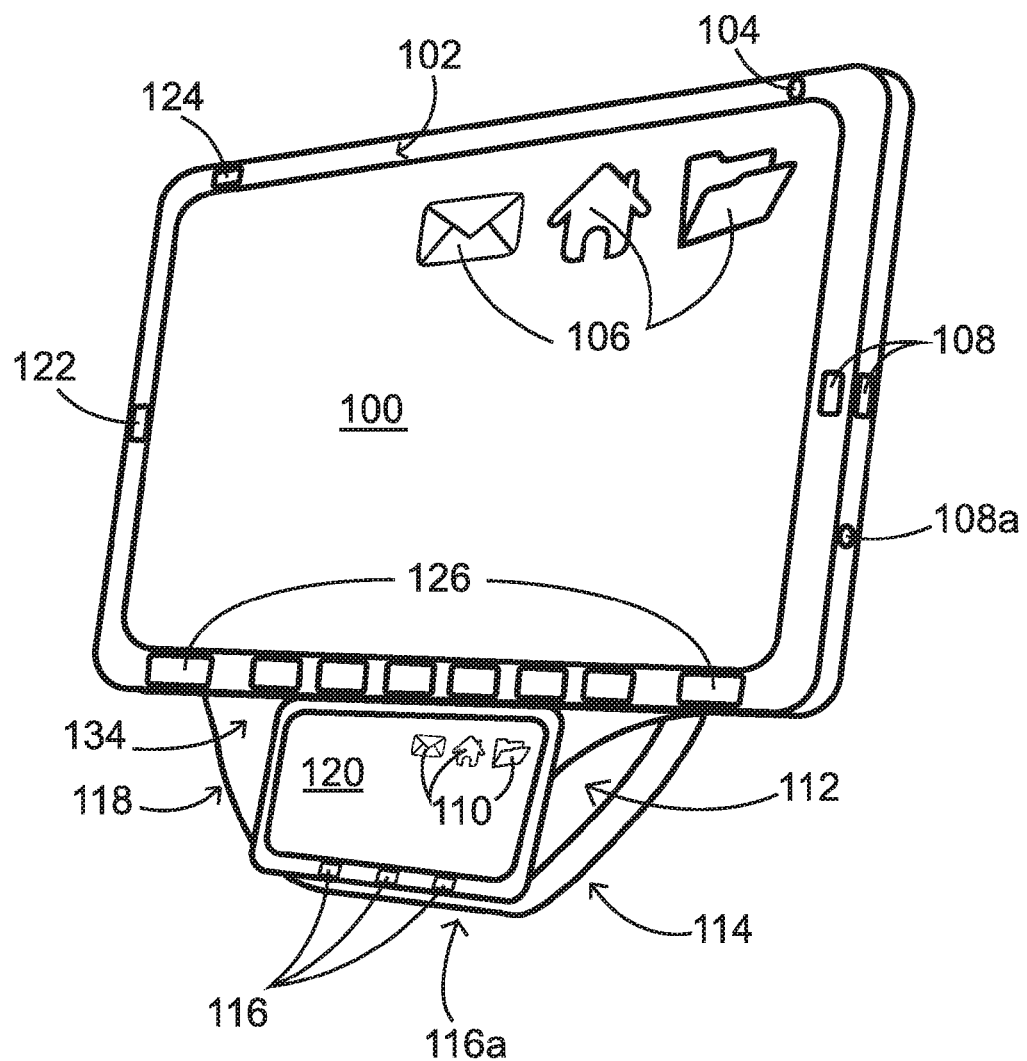
FIG. 1A is a perspective right-front angled view illustration showing exterior of example #1 embodiment of construction.
Figure 1B:
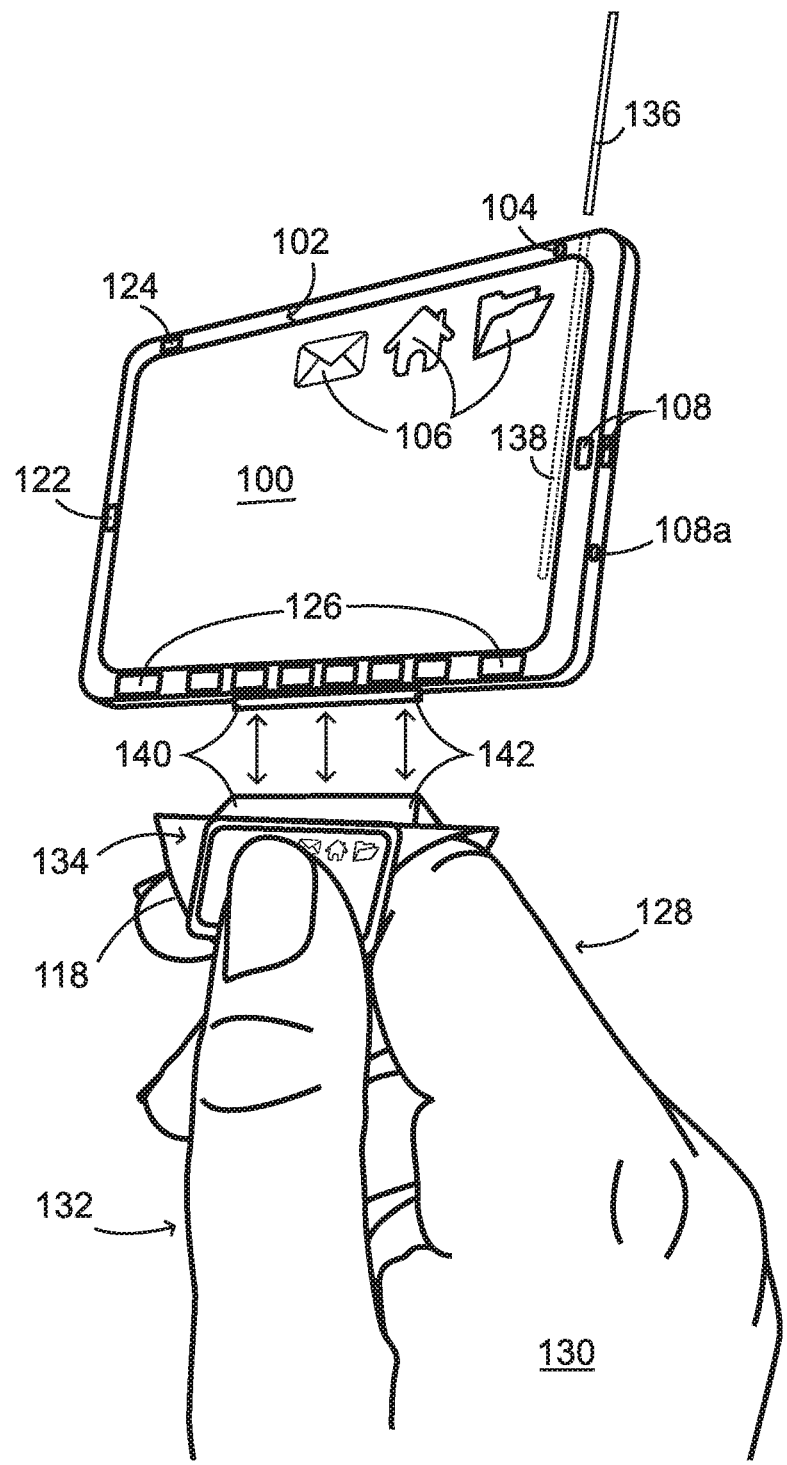
FIG. 1B is a perspective right-front view illustration showing exterior of example #1 embodiment of construction demonstrating, removable display screen and stylist pen tool attachment.
Figure 2:
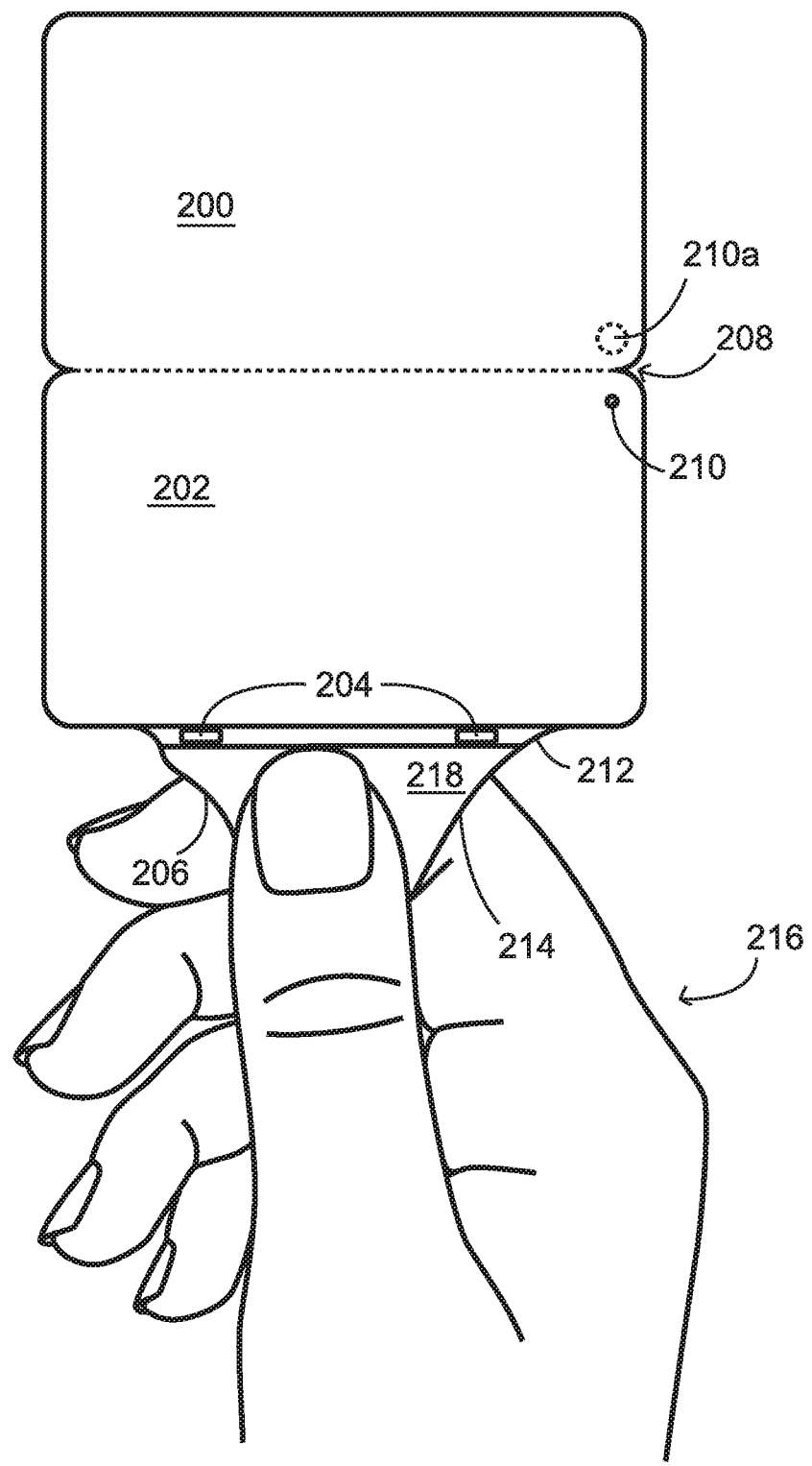
FIG. 2 is a perspective front view illustration showing exterior of example #2 embodiment of construction demonstrated being worn, illustrated on right index finger of an example user hand.
Figure 3:
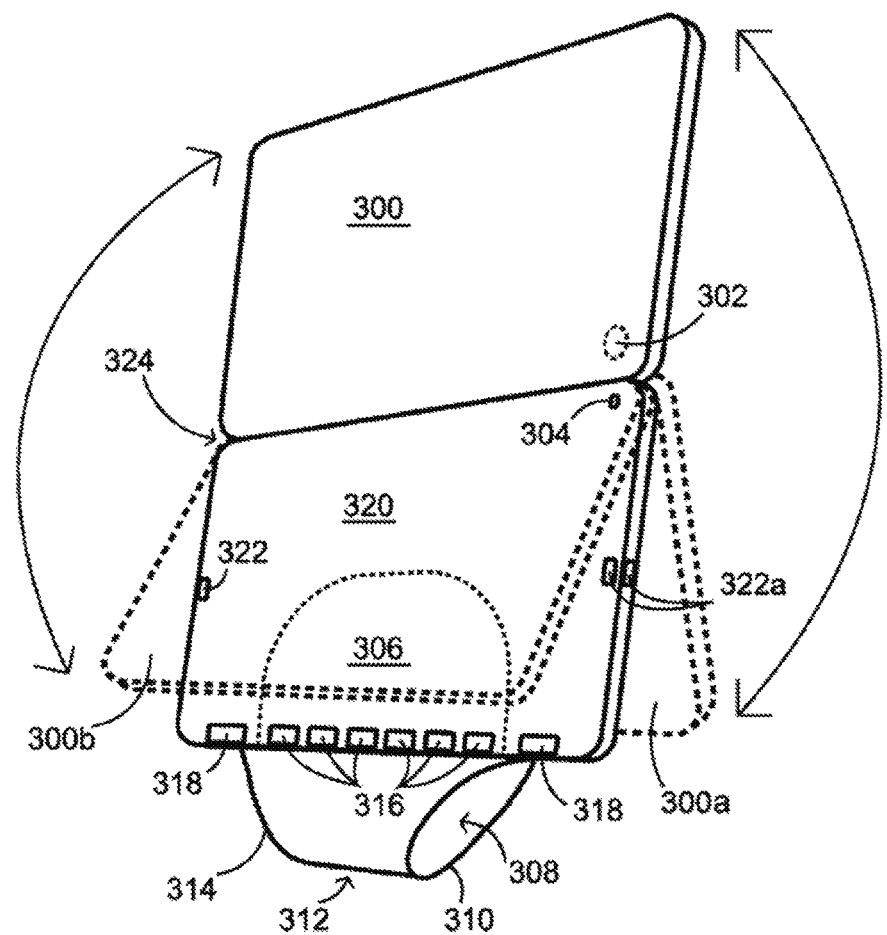
FIG. 3 is a perspective right-front view illustration showing exterior of example #3 embodiment of construction without separate thumb touch pad but including designated area on touch display screen surface for enhanced input tracking of thumb.
Figure 4:
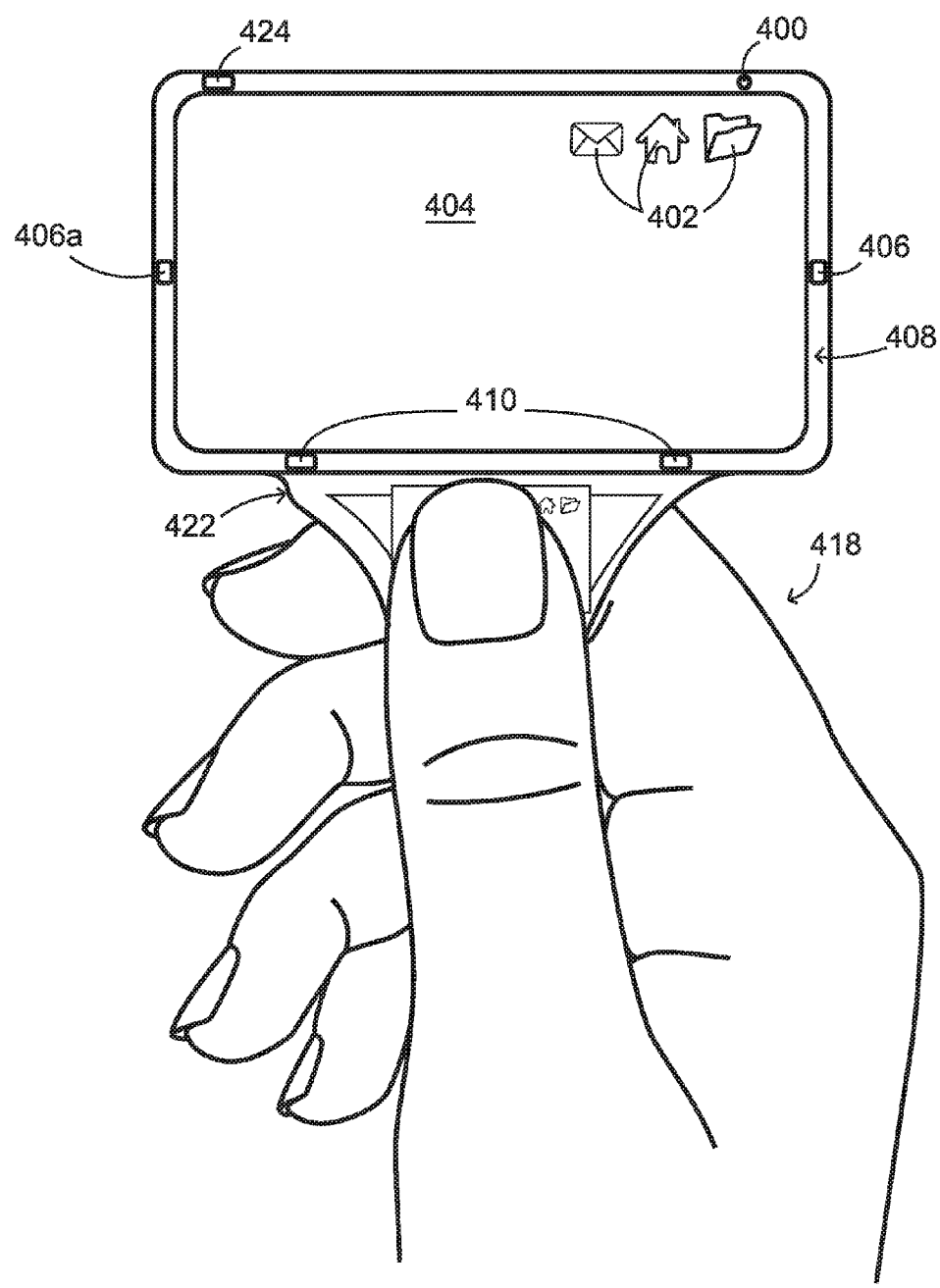
FIG. 4 is a perspective front view illustration showing exterior of example #4 embodiment of construction, demonstrating the thumb pad sensing area being a designated part of the ring type base holder and display, held in a user preferred position on example user right hand index finger.
Figure 4A:
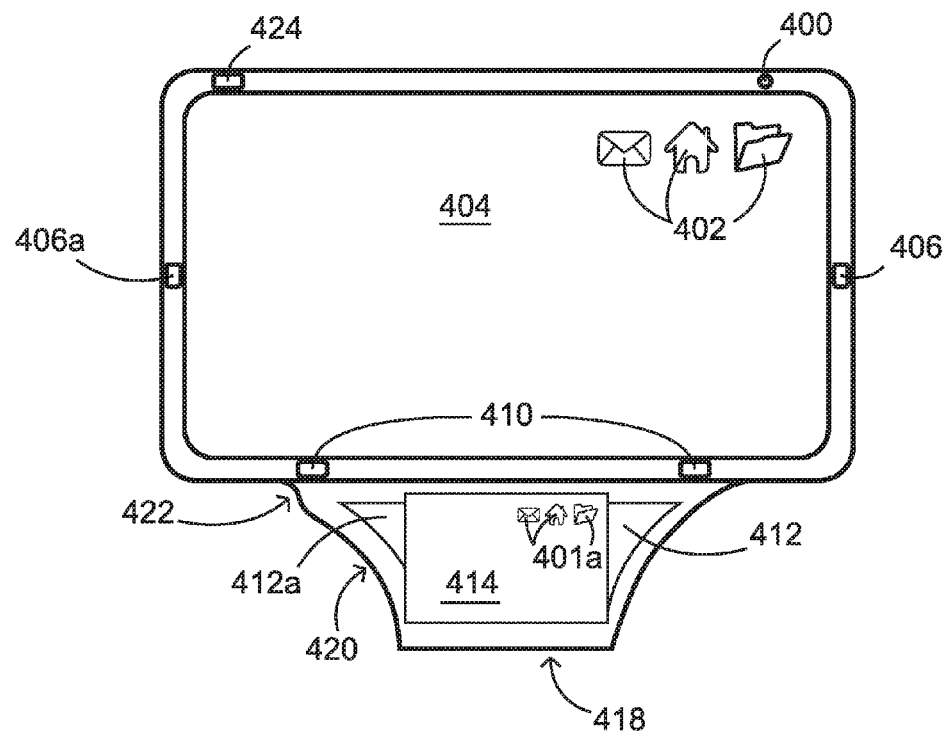
FIG. 4A is a front view illustration showing exterior of example #4 embodiment of construction, demonstrating the thumb pad sensing area being a designated part of the ring type base holder and display.
Figure 6B:
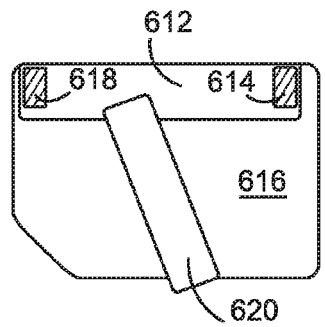
FIG. 6B is a back view illustration showing exterior of example #6 embodiment of construction.
Figure 6A:
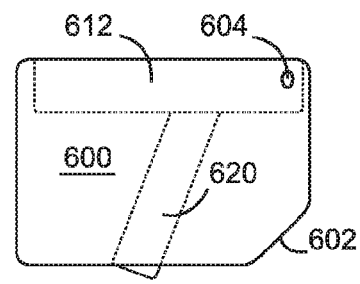
FIG. 6A is a front view illustration showing exterior of example #6 embodiment of construction, user interface track pad screen.
Figure 6C:
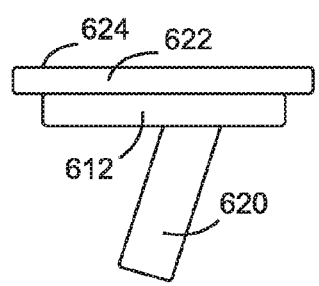
FIG. 6C is a bottom view illustration showing exterior of example #6 embodiment of construction.
Figure 6:
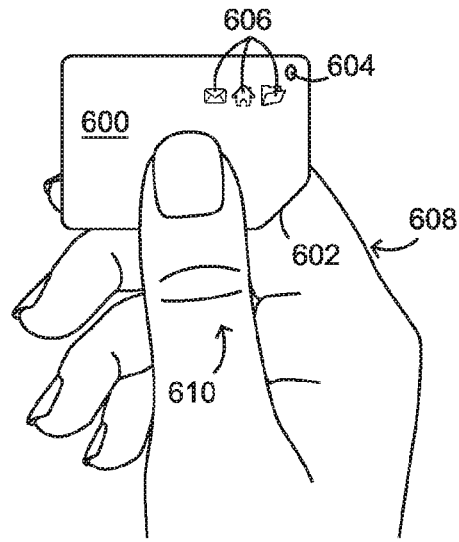
FIG. 6 is a right-side front perspective view illustration showing exterior of example #6 embodiment of construction, demonstrating the thumb pad sensing area being a designated part of the ring type holder base and display, demonstrated held in a user preferred position on example user right-hand index finger.
Figure 6D:
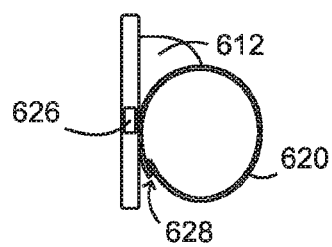
FIG. 6D is a left-side end view illustration showing exterior of example #6 embodiment of construction, additional demonstrating the ring type base holder with overlap expansion area.
Figure 6E:
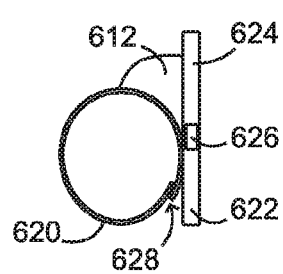
FIG. 6E is a right-side end view illustration showing exterior of example #6 embodiment of construction, additional demonstrating the ring type base holder with overlap expansion area.
Figure 7B:
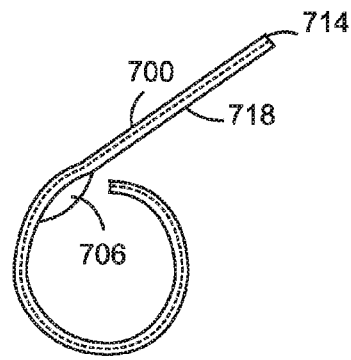
FIG. 7B is a right side end view illustration showing exterior of example #7 embodiment of construction, demonstrating a portion of the shape responsive flexible display in an open position, also demonstrating a sandwiched layer of construction.
Figure 7C:
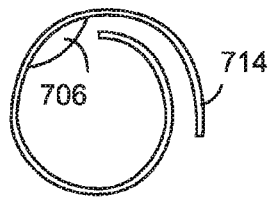
FIG. 7C is a right side end view illustration showing exterior of example #7 embodiment of construction, demonstrating a portion of the shape responsive flexible display in an optional closed position.
Figure 7D:
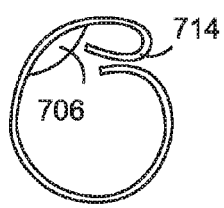
FIG. 7D is a right side end view illustration showing exterior of example #7 embodiment of construction, demonstrating a portion of the shape responsive flexible display in an alternative optional closed position.
Figure 7E:
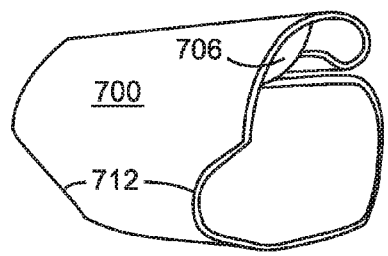
FIG. 7E is a right-side front angled perspective view illustration showing exterior of example #7 embodiment of construction, demonstrating a portion of the shape responsive flexible display in a demonstrative alternative closed position.
Figure 7:
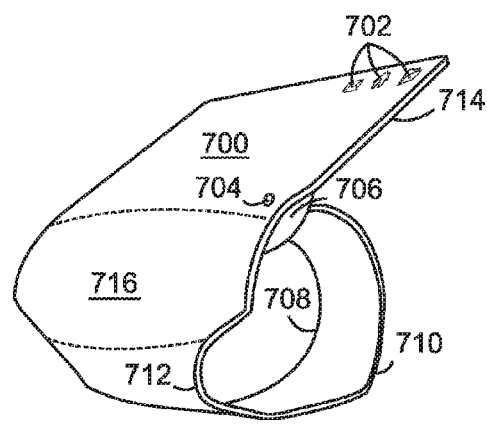
FIG. 7 is a right-side front angled perspective view illustration showing exterior of example #7 embodiment of construction, demonstrating the thumb pad sensing area being a designated part of the ring type holder base and the shape responsive flexible display screen being the exterior of the wearable device.
Figure 7A:
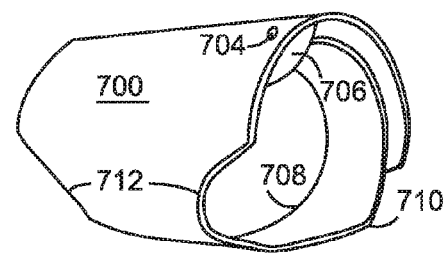
FIG. 7A is a right-side front angled perspective view illustration showing exterior of example #7 embodiment of construction, demonstrating a portion of the shape responsive flexible display in a closed position.

100—Display screen may include touch input technology
102—Example of exterior casing structure (optional)
104—Showing example of front facing camera location
106—Showing example of display Icons
108—Showing example location of microphone/speaker
108A—Showing example of placement for jack/plug-in for earphone buds
110—Showing example of tracker pad location of mimicking Icon's for inputting thumb position command and control of icons mimicked on selected display screen(s)
112—Showing example of sensors inside ring-type base holder, sensors to input wearers self-monitoring information of biometrics, e.g. blood pressure, heart rate, etc.
114—Showing example of ring-type base holder with rounded edges of entrance and exit points.
116—Showing examples of exterior push buttons for user control over selected commands
116A—Showing example of non-active, thumb pad rest spot location. A neutral position
118—Showing example of cut out formed shape to allow user better finger movement while device is being worn.
120—Showing example of thumb track pad top exterior surface
122—Showing exterior example of location of phone speaker/micro-phone
124—Showing exterior example location of infra-red transmission & reception port (or other wireless transmitter, receiver or transceiver).
126—Showing exterior example location of speakers.
128—Showing illustrated lines, outlining example of a user's right-hand index finger.
130—Showing illustrated lines, outlining example of a portion of user's right-hand.
132—Showing illustrated lines, outlining example of a portion of user's right thumb.
134—Showing illustrated lines, outlining example of a portion of external ring type base holder.
136—Showing illustrated lines, outlining example of a portion of styles pen.
138—Showing illustrated lines, outlining example of a containment area for styles pen.
200—Showing example of upper display screen can be flipped up and/or over to backside for further use and/or as table stand platform.
202—Showing example of lower, display screen, may include touch input technology.

204—Showing example locations of speakers.
206—Showing example of curved cylinder cut-out for better fix and support.
208—Showing example of hinged line area allowing movement and attainment of upper display screen.
210—Showing example forward facing camera location.
210A—Showing example of opening/window for camera to view through upper screen when upper screen is in a closed position.
212—Showing example of arched type supports, as means of support and attachment between the display screens and the wearable ring type base unit.
214—Showing example view from user's eye position of wearable ring type base unit and thumb track pad Area.
216—Showing example view of a user hand, while wearing an example embodiment of the invention.
218—Showing example view of outer curved surface of ring type base holder that may include active track pad area on curved surface.
300—Showing example of optional upper display screen, may include touch input capability, can be flipped up and/or over to backside for further use and/or as a table stand type platform.
300-A Showing example of upper display screen can be flipped up and/or over to backside for further use and/or as table stand type platform.
300-B Showing example of upper display screen can be flipped up and/or over to backside for further use and/or as table stand type platform can act also act as display screen cover.
302—Showing example of opening/window for camera to view through upper screen when upper screen is in a closed position.
304—Showing example forward facing camera location.
306—Showing example area of enhanced performance sensing for user thumb track pad area.
308—Showing entrance area of adjustable ring type base holder.
310—Showing rounded edges and cut out angles of ring type base holder.
312—Showing bottom portion of ring type base holder.
314—Showing example of curved cylinder cut-out for better fix and support.
316—Showing example area of operable buttons useable by user's thumbs action.
318—Showing example locations of speakers.
320—Showing lower display screen area, includes touch input capabilities.
322—Showing exterior example of location of phone speaker/microphone.
322-A Showing exterior example of location of phone speaker/microphone.
324—Showing example of hinged line area allowing movement and attainment of upper display screen.
400—Showing example of front facing camera location.
402—Showing example of display icon/tile etc. that can be mimicked and manipulated form corresponding location on thumb track pad area.
402A—Showing example of display icon/tile and the like, that its location mimics that which is on the main display screen so that user can touch, manipulate from corresponding location from the thumb track pad designated area.
404—Showing example of display screen, may include touch input capabilities.
406—Showing example location of microphone/speaker for phone use.
406A—Showing example location of micro-phone/speaker for phone use.
408—Showing example of exterior casing of display screen.
410—Showing example locations of external sound speakers.
412—Showing additional thumb track pad area that can be assigned specific functions by user.
412A—Showing additional thumb track pad area that can be assigned specific functions by use.
414—Showing example of exterior curved surface of thumb touch track pad enhanced command area.
416—Showing example view of a user hand, demonstrating wearing an example embodiment of the invention on example user index finger.
418—Showing the curved underside of ring type holder base that preferably fits between the first and second knuckle of user index finger.
420—Showing example of cut out shape to allow user better finger movement while device is being worn.
422—Showing example of arched type supports, as means of additional support and attachment between the display screen(s) and the wearable ring type holder base unit.
424—Showing exterior example location of infra-red transmission/reception port.
500—Display screen with direct response marker point tracking sensors for thumb control over command response actions of screen command movements of thumb action.
502—Forward facing camera port.
504—Back surface of case material.
506—Back facing camera port.
508—Outside material of case covering internal electronics, processor's, chips, memory, power supply, battery (s) and the like.
510—Ring type base holder designed to be best on the user's index finger between the first and second knuckle, expands and contracts to adjust to user's finger size for fit and feel.
512—Illustrates rounded exterior edges of ring type base holder and demonstrates the molded curves to allow user finger flex and promotes user comfort for extended use.
514—Outside edge of display screen/track pad shows rounded edges for safety if brushed against user skin etc.
516—Demonstrates and shows example Icon on Display screen/Touch screen track pad.
518—Example illustration of user's thumb demonstrating movement on and over display screen/touch track pad.
520—Demonstrates that user's index finger is allowed to protrude through ring type base holder and is then, open and capable of additional uses.
522—Illustrates that there may be overlapping areas within the ring type base holder that is adjustable latch-able in position, allows tension on user finger for stability and allows finger to be quick, safely released from position if circumstances result is such a need.
524—Illustrates exterior edge of left side of display screen in which may include casing for protection of edges.
526—Illustrates curved outside edge of ring type base holder.
528—Illustrates example of transmitter port/receiver port for remote control of and over capable electronic devices.

600—Display screen with touch sensitive input capabilities and may have enhanced tracking of marker points selected and placed on user's finger(s)/thumbs to allow sensors to follow/track and detect marker precise movements and process user commands and inputs.

602—Illustrations a slanted cut off from the rectangular shape of display screen/track pad. This allows the device when worn on the user index finger between first and second knuckle to fit ergonomically without pinching into the upper portion of the user's index finger (608). All edges are rounded and beveled to smooth fit and feel in use.

604—Illustration demonstrating example location of forward facing camera.

606—Showing example Icons on Display screen.

608—Illustrating index finger of example user hand.

610—Illustrating thumb of example user hand.

612—Illustrating example location of electronic components case covering for containment and storage, which may contain one or more processor's, memory components storage, antennas, transmitters, receivers, speakers, micro-phone(s) external jacks and/or ports, vibrators, sirens. May also contain an accelerometer.

614—Illustration of example location of transmitter/receiver port for infra-red and/or additional forms of interaction with remote control over capable equipped electronic devices.

616—Illustration of the back side of the Display screen/touch pad.

618—Illustration of example location of rear facing camera.

620—Illustration of ring type base holder angles for display screen to be correctly oriented to user eyes to reduce user stress and tension and promote ergonomic position for comfort in long term use and transport.

622—Location on device showing exterior edge of Display screen/touch pad may contain infra-red sensors as part of scanning methods, helping to refine pin point location of user selected marker point on or attached to user finger/thumb.

624—Front edge of Display screen/touch pad.

626—Example locations of microphone/speaker for phone use, etc.

628—Location demonstrating adjust-ability and release area of ring type base holder.

700—Location of outer exterior of continuous flexible touch sensitive Display screen/touch pad.

702—Examples of Icons on Display screen/Touch pad.

704—Example location of forward facing camera.

706—Example location of internal components compartment. May also contain an accelerometer.

708—Example location inside ring type holder for sensors to provide self-monitoring, detecting heart rate, etc.

710—Showing rounded edges for safety, fit, feel and comfort sliding finger in and out.

712—Showing cut out shaped design to provide comfortable fit when worn on the user's index finger between the first and second knuckle.

714—One example of screen closer, retracted to a predetermined position.

716—Example location of enhanced touch pad sensing of user's finger/thumb with or without assistance of marker-point location technology.

718—Illustrating external edge revealing bottom layer of lightweight webbing of metal with memory adjusting forming abilities clad/sandwiched embedded in flexible resin type material with flexible Display screen/touch pad on top. When activated the metal webbing can reflex, respond, or otherwise assume one or more shapes of pre-activated, predetermined form/shape. This aspect of the disclosed invention has carry over benefits to a broad range of additional applications and uses in multitude of additional products and their functions thereof.

DETAILED DESCRIPTION

A thumb controlled track pad can have direct response over the view screens command and control location activation points, lay-out pattern(s), sizes and sensitivity of touch point input for, key stroke, and/or cursor location(s) could be changed as per user desired selections of keyboard, style(s), layout(s) option(s) user chosen, from menu of selections this could benefit user performance and promote superior ergonomics of user(s) finger/thumb movements, thus limiting undesirable stretch, reach, placement of user(s) finger(s)(thumb) placement(s), and limiting number of keystroke actions require by user to preform like tasks as compared to traditional user input method(s).

Referring now to FIG. 1, a perspective front angle view of present invention a personal electronics device (P.E.D.) with wearable capabilities, 114, showing exterior of example #1, embodiment of construction is shown, demonstrated in illustration worn as it would be seen on the user's right hand index finger between the first and second knuckle of example user hand 130, interchangeable between the left and right index finger 114 supports the P.E.D., while in single hand operation and/or transport. The ring type base holder, 114, is adjustable in circumference to provide fit and feel to users' needs and desires. The overlapping expandable/retractable ring type holder base, 114, can be locked into user preferred size but also provides immediate safety release from user finger, 128, if the P.E.D. is unintentionally caught on an unmovable object, (not shown), thus providing escape protecting user's finger, 128, if such an event should occur. The ring type holder, 114, allows for the wearer to rotate the P.E.D. On user's index finger, 128, to move and allow the screen, 100, to lay back against user same hand, 130, fingers for user transport comfort, not illustrated. The P.E.D. may also be rotated on user's finger, 116, to lay in the palm of user's hand, 130. This allows the user to raise their right and/or left hand with P.E.D. to their ear, positioning microphone/speaker, 122, and/or 108, user's ear allowing additional privacy and voice convenience for phone conversation activities. Instructions can cause a computing environment to determine whether speaker/micro phones, 108 and/or 102, is positioned upward in relationship to user's hand and command that instrument to receive as micro-phone or transmit as a speaker of the phone use system.

The case, 102, of the attached and/or detachable display screen, 100, can be made of fitted and/or molded medal alloys such as aluminum and/or plastic, ceramics and the like or any combinations thereof. The case, 102, allows for enclosure, positioning and protection of a reception and transmitting port 124 for interacting remote control of, and with capabilities equipped remote electronics, T.V., recording and storage electrical devices, game players, P.C., laptops, tablets, smart phones, smart glasses, smart watches and other capable controllable devices.

The disclosure provides for wireless transmitter and receiver that may transmit an infra-red and/or radio frequency carrier signal and may receive same within a service area. A disclosed device can include a wireless transceiver and memory and further functions to store at least some of the remote control information and instruction coding. The display can be operable connected to memory and processor for display and interaction control coupled to input and responses thereto of remote device information and direction commands thereof.

Some disclosed devices also may act as a cordless telephone handset, cellular radio telephone, CT2 radio telephone handset and land mobile two-way radio.

A forward, front facing camera is located within the device, 104, in which promotes two-way web cam communication, Skype being a commonly used example. Forward facing camera can be both still and video types with additional options of H.D., 3 D, and the like. The device may permit automatic, remote launch of use to accommodate time lapse life sequence type apps/programs as user allows. For example, the device can automatically open an image capture application and initiate an alarm to remind the user to look at the device. The camera can take the picture.

The user may select on a menu of options what types of option of thumb pad/track pad is functional to the device, i.e. a standard universal track pad, an enhanced Direct response track pad, direct response track pad positioning control make a number of tasks significantly easier. (a track pad that instantly moves command point cursor to the spot directly under a user selected mark point "a pin point" located on user finger or thumb) that mimics what is shown on larger display screens, attached or remotely operated screen/devices by influence on and over operators track pad acting as multi-touch track pad for clicking, scrolling and swiping and supports a full set of gesture recognition (like flipping through book pages) control and inter acts with what is on screen, can read and identify the selected marker point movements and the contact pressure when screen sensors detections are sent to operating systems for process and provide actions thereto.

The touch track pad, 100, 120, 200, 202, 218, 300, 404, 414, 500, 600, 700 and 716 can senses a plurality of transducer means, each means adapted to being incorporated in track pad sensor embedded panel array. The applied marker point on the user's finger/thumb pad this producing a related signal of position and pressure between the interactive entity and a virtual or physical object triggering a command interacting communication with the controller computer. Transducer may compromise a combination of a pressure sensitive foil and an inertia mass being pressed against said foil under influence of thumb actions generating signal means also from distortion sensors from within the array. Transducers may be designed to generate electrical signals sensed upon touching and/or approaching them. Pressure dependent sound sensors may also be deployed, operating accordingly to the piezoresistive principle (ceramic that gives off energy when compressed) thus signaling processor to respond accordingly. The transducers may react to various physical phenomena in order to generate electrical signals, preferably, by influence of mechanical forces, for instance pressure, electrical, optical or magnetic influence using variations in resistance, capacitance, reflectivity or magnetic flux.

The track pad, 100, 120, 200, 202, 218, 300, 404, 414, 500, 600, 700 and 716 is intentional and vitally located in close ergonomically proximity located in relation to thumbs movement reach over and on track pad where thumbs movement can produce output signal to processor to activate and realize command actions thereof. Additional touch display keyboards can be selected by user operator for added inputting options, not illustrated. Optional joysticks, trackballs and the like may be included within the device if desired.

Existing art touch screens, require two fingers and their movement to expand or constrict, zoom in zoom out and selected object on screen needs to be located a fingers pin—together, spread out or rotated appropriately. The disclosed devices can be designed for single hand operation and allows the user/operator to use their finger/thumb with one or more preselected marker-Points user assigned and designated for reception position points on or above track pad designated areas, the user can swirl right or constrict image, zoom in and swirl left to expand, zoom out. A user with two or more location marker points applied and/or identified on finger tip/thumb tip pad can select an image on screen with primary user marker identification point then a turn finger/thumb in direction for image to be rotated. The interior track pad and/or active designated active area, 218, 306, 414, and 716 is click-able, scrollable, swipe-ably, rotatable, zoom-in, zoom-out, etc. Additionally, tape-able and double-tap-able to engage protocol actions.

300—The display cover is flexible and can be used additionally as a table top stand for the device.

508, 612 and 706 contain components of a computing system and software and programs for implementation of computing systems. The components may include custom operating systems of gaming operated from device. The components may include computing resources for service over and on a network(s).

508, 612, and 706 optional power sources may be included "ambient energy collectors" such as solar panels and RF antennas. Device capable of detecting periods of inactivity and is equipped with means to power down to conserve battery life and remain dormant until reactivated.

A Ring Type Wearable Base for Stability, Mobility, Usability

User interface devices comprising a finger wearable body which can be maintained in a substantially fixed position relative to the user's hand without immobilizing the user's fingers are disclosed.

Some embodiments of disclosed computer interface devices and associated systems can be worn on an index finger (or other selected finger) of either of the operator's hands. Some systems can include a ring type, base holder, ring type base holder being adjustable to a selected dimension suitable to be worn on a portion of the middle of, for example the index finger, best suited if worn between the first and second knuckle (e.g., overlying the middle phalanx of any of the user's digits) of the user's index finger of the operator's hand, and may be adjustable to user's finger size(s), ventilated, enable innovative methods for reading/monitoring a user's biological characteristics (e.g., heart rate, blood pressure, temperature) and support additional feedback systems that may be stowable, folds away when not in use and may include support braces from ring type holder that may be connectable to tracker pad and/or display screen(s) segments of device. Some disclosed device/system also includes means for identifying, marker point(s), on user's thumb(s)/finger(s) as additional means for specific point sensing on or over the track pad portion of device.

According to another embodiment, the main display screen, the track pad area and the, "ring-type" holder base can be mounted in an adjustable spaced relationship to engage the user's preferred finger, position and size, within a reachable area of the user's thumb(s). Such a configuration can facilitate input functionality on designated track pads input area position. Some disclosed devices may be adapted to have a pivotable or otherwise adjustable movement to align to a user's specific needs, wants, or desires.

Some disclosed devices can be worn and transported while permitting movement of the user's fingers. Such a device can also easily be configured and aligned to be situated adjacent to the back of the user's fingers for easy transport, but still readily available for immediate use.

In another embodiment, the device can also be easily rotated while still mounted on user's e.g., index, finger, designed to fit with spaced relationship to engage the user palm of hand thereof, inside the user's palm for transport, use, and/or to be held up to the user's ear for private phone type conversation, with speaker and microphone in the device properly positioned for same (reversible for left and or right hand use).

Some input devices and systems, e.g., a track pad, can be configured as a controller and can be positioned in an immediate proximity of the user's thumb reach from the area of the ring type wearable holder base for operator controlling sequences which enables quick control of an appreciable number of operations with considerably reduced fatigue and effort while still allowing user use of arms and allow mobility of user's finger while transporting the device.

Some interface devices while being worn can remain in a stable position while being operated, thus, immediately available at arms-reach, ready for operation when needed or desired.

Some disclosed devices are ergonomically shaped and ergonomically operable and can facilitate single-hand use, universality and prevent over reach of user thumb(s) while in use.

Some devices include a hand/finger attachable, wearable base that is ergonomic and customizable to user/computer interface device.

Some input devices and systems are operable from a single-hand, are operable from any reasonable location and do not require a prominent, dedicated, smooth, flat, horizontal surface or other special surface upon to be place upon for use of functions.

A ring-type base holder can be easily attachable, wearable. Some devices slide, clip, snap and the like onto and/or around an index or other user selected finger and can be comfortably "worn" for extended periods of time in a variety of climates, environments associated with use work and personal travels, enabling the user to wear/carry the device from one location to another with minimal handling.

Some devices provide additional options for industry and consumers by offering new shapes, sizes and styles of wearable P.E.D.s that may include, unique designs incorporating additional technology capabilities as they become available.

Some ring type holder bases may be deployed in many shapes, sizes, and methods. Some devices define ventilation apertures in a region adjacent or overlying with a wearer's finger(s). Uncovered surface areas to allow potentially trapped moisture to escape moisture that may otherwise cause skin discomfort. Ventilation cut outs may incorporate holes, slots, shape design cutouts, and the like.

Slanted support ridges can extend from the looped ring-type area of the holder attached and/or to the attachable track pad and/or the attached and/or attachable display screen(s) attachment area(s).

Image quality problem factors (variables) that are affected by the position of the viewer's eyes in relation to the position and angle of the devices screen(s) can be addressed. Small screen devices often must be held at a proper distance, angle, and attitude for user to achieve the best (or even a suitable) screen resolution and to limit distortion, glare and shaking the deterioration of any one of these variables can result in an unacceptable image and/or eyestrain for the user. Some disclosed devices provide a suitable combination of orientation and distance from a user to provide a suitable view of an otherwise difficult-to-view screen.

A ring-type holder platform and an associated main display screen with components in housing can be connected integrally or separably connected together, and may include a Flexible Ring-type strap/band may be utilized to provide user safety, comfort/fit and feel. Additionally the ring type holder's exterior surface may be flexible display (curved and shaped as part of the ring type holder) (touch) screen itself, thus utilizing additional (touch) display area hereby enhancing user options, e.g., color display moves to music, scrolls updates and a multitude of additional options In another embodiment a holder is included, retained by hand and/or retained by finger, ring-type, holder configured to offer the user the ability for tilting, sliding and rotating the device to a chosen user position yet immediately changeable as user desires.

A device can easily adjust and turn to be in the palm front of the hand for (up to the ear) phone use when not employing speaker phone.

A device with holder base can adjust to user's desired dimensions, angle, shapes, sizes and positions user desirable.

A device can be personalized expanded for individual desired wants and needs.

Wearing the Smart Phone Type device can greatly diminish the chances of forgetting the locations of the user's phone; also it's less likely to set the device down where it could be forgotten, lost or stolen. The more the device is worn the less likely it is for the user to "sit on" and break the device when put in a rear pocket. Also the user does not need to search for where the "phone ring" is coming from, because the device, the phone, is worn on user's finger(s).

An interface device can remain in a stable position while being worn and also while being operated, thus, it is always ready for operation when needed.

A wearable design can allow the interface device to be used comfortably for extended periods of time without feeling fatigue and with limited interference of day to day use of user's thumb and forefingers.

The ring-type holder platform and the main display screen with components in housing can be connected integrally or separably connected together.

Track Pad Area, Marker-Point

Further disclosed are various forms and methods of electronic communication devices with addition of thumb control interface with specific input point tracking technology to identify user source input point(s) on finger/thumb controlled touch pad and or track pad area. A device that is wearable on user(s) finger(s) for single hand operation, through input control on ergonomically reachable thumb active input area.

A new type of thumb activated track pad is disclosed that helps overcome the shortcomings of prior art by allowing the user to have full view of display screen while directing a pointing device on a small scale direct response track pad attached to a ring type base holder wearable on user's index finger.

A device with a track pad for input compatible for control through user's thumb small movements, a device capable for user to select/change/adjust keyboard styles, layouts and performance, reaction time of sensing and spacing to promote superior ergonomics and efficiency of user inputting control thereof.

In another embodiment, a dedicated portion of the touchscreen can have an operable display, virtual keyboard options that are placed in reach and placement for interaction by user's thumb(s) and responds/detects reaction to location-based distortions of thumb movements/actions.

A thumb track pad interface control apparatus can comprise: a movement sensor configured to sense, and identify a marker point(s) on user's thumb(s)/finger(s) and the magnitude of movement on/or over tracker pad and for generating a specific identified marker point signal in response to the sensed magnitude of movement, the movement and pressure of sending marker(s) can be selected from or combinations with e.g., Ink spot, identified finger print location spot, attached or applied symbol(s), spot(s), reflector(s), and the like. Such a marker system can identify a specific location on user(s) finger(s)/thumb(s), tip(s) pad(s) of the human for signal generation and/or signal receiving associated with such specific point locator markers for sensing and/or receiving information pertaining to location, pressure, etc.

Identifying marker point(s) on user's thumb(s)/finger(s) can move in tandem with finger/thumb movement and pressure over and on the track pad area equipped with sensing means.

A track pad can have a designated area included to contain a smaller representational representation pattern of the user desired display screen contents. The icons, tiles, images and the like, that the user intends to manipulate, click on, move, swipe, enlarge, reduce, maneuver, interact with etc. on the user's selected display screen(s).

A signal generator and/or receiver can generate a second response signal in accordance with a predetermined output response to per-programmed computing processor thereby determining actions presented and displayed on desired display screen(s).

A display screen and the element can display signal generated by user's thumb signal point movements in three (3) dimensions. The third dimension represented the response to and from the closes edge of a three dimensional caricature display image.

A track pad can have additional optical sensing of user's assigned marker point(s) focusing images in the region in front and/or over the tracking pad sensor(s) for transforming the collected image points to electrical signals transferred to computing processor for returned display interaction promoting user command actions. The electrical signals can be coded and assigned display actions showing user requested images and changes thereto, providing means for high accuracy thumb-tip marker selection location interaction with computer and displayed on monitor(s).

A compact, lightweight and efficient device that can be capable of identifying the effects of operators thumb movement actuated for pinpoint responses to push, thrust, tap, slide, swirl type motions of user selected marker point on the thumb surface, sensed upon, or over touch screen track pad area. The input sensors can recognize known patterns of motion that correspond to know input patterns of motion, touch, tap, slide, etc. The embodiments can be user sensed in a compact and efficient manner which decreases the amount of operator fatigue skill movements required.

Further disclosed are various forms and methods of electronic communication devices with addition of thumb control interface with specific input point tracking technology to identify user source input point(s) on finger/thumb controlled touch pad for a device that is wearable on user(s) finger(s) for single hand operation utilizing source input points marker locations movement parameters are detected and displayed on screen.

Thumb tracker pad interface area can be attached with computing systems and ring type holder that may operate as a user interface platform in an independent manner that provides user with quick, direct access to touch, click command actions to launch software applications and other user options available through the device.

In one embodiment, an apparatus embodies a track pad, input system and permits the use of associated methods therewith. A track pad, primarily used by operators thumb, can have a sensor configured to detect a finger movement and can emit a position signals and movement of, designated marker, designed to be identifiable by track pad area sensors. This novel method alone or used in conjunction with touch screen(s) allows for more efficient, precise and less tiresome operation by the user than with other input devices and means.

A novel wearable interface (Smart Phone) type device can be capable of performing marker place tracking and read user commands on and over, inputting track pad area.

In another embodiment a Track Pad, and or designated track pad area can be on touch screen display predominantly operated by user's thumb(s).

A thumb track pad surface area can have one or more small inverting dimples and/or raised extruding or other structure bumps on the track pad surface area for user feel of textile recognition specific location points on surface of pad area.

In another embodiment, lining the outside perimeter of touch based track pad can be push button type switches, aligned in sets to be assigned functions and engaged, activated by user applying touch force against their top surfaces by thumb/finger tap pressure inputs thereon.

Presently required repetitive sequences often requiring use of multiple finger functions can be reduced or eliminated with disclosed devices and associated methods.

In another embodiment the track pad area function also can acts as an intermediary between the user commands and the functions fulfilled on screen(s). The thumb track pad area can be able to accurately detect a new signal from the user and be able to respond appropriately. The position of the ring-type holder in alignment with thumb interface pad can better facilitate navigation of a screen interfacing selections/commands thereof without the user needing to reach and/or touch difficult to reach areas of hand held type devices touch display screens.

In another embodiment, it is easily shown that productivity is inefficient when a user must first locate a cursor location and then maneuver it to the user desired location on screen. A user selection to have the cursor location instantly locate to a point on the screen where the user marker point is located on or above the thumb track pad area interface, thus saving time and increasing user productivity. Also provides user quick access to start software applications with the simplicity of navigating to and away from icon, windows, tiles, etc.

User Input Devices

At user's options, desired and convenience, the user can select amongst a menu of keyboard layout selections to be displayed and activated, at designated area within the touch screen for ease of user finger/thumb reach to desired actuation contact areas.

A control device comprising a body which can be maintained in a substantially fixed position while in use or at rest on the user's hand, worn on a finger of user's hand without immobilizing the user's fingers while carrying and/or operating a plurality of technology performances supported by said device.

Additionally, a user, options of keyboards and input methods, included with the device, the user has a wide array of input and control options available for selection not available with prior art.

A computer (smart phone, type) interface device can be predominately worn on the index finger preferably between the first and second knuckle of the user's desired hand of such device.

An interface device may be operated remotely away from the, a, display screen(s) being controlled by said device, physically separate from the display screen(s).

A computer interface device can have a tracker pad area, primarily operated by user's thumb(s) that promotes single hand use(s) and expedites data entry and command points accuracy that is light weight, compact and can be operated with one hand.

A user interface device can comprise a finger wearable body which can be maintained in a substantially fixed position relative to the user's hand without immobilizing the user's fingers.

The main display screen the track pad and the, "ring-type" holder based can be mounted in an adjustable spaced relationship to engage the user's preferred finger, position and size, the user's thumb reachable area to facilitate input functionality on track pad area position, adapted to have pivotal adjustable movement to align to user's specific need and desires with Track Pad positioned to be predominantly operated by user's thumb movements.

The device can be worn and transported while permitting movement of the user's fingers. The device can also easily be configured and aligned to be situated adjacent to the back of the user's finger for easy transport, but still readily available for immediate use. The device can also be easily rotated while still mounted on user's index finger, with the fit designed with spaced relationship to engage the user's palm of hand thereof, inside the user's palm for transport, use, and/or held up to the user's ear for private phone type conversation, with speaker and microphone in the device properly positioned for same. The device has directional sensor(s) and to automatic switch speaker to microphone if used by user's left or right hand.

A holder can be retained by hand and/or retained by finger worn, ring-type, base holder platform, offering the user the ability for tilting, sliding and rotating the device to a chosen user position yet immediately changeable as user desires for user to preform single hand operation, mobility and control.

Thumb/Finger Marker Point

Tracker Pad Micmics

In one embodiment, an apparatus embodies a tracker pad area, input system and methods therein. A tracker pad, primarily positioned to be used by operators thumb has a sensor configured to emit position signals reflecting movement of a designated marker, designed to be identifiable by tracker pad sensor. This novel method alone or use in conjunction with touch screen(s) allows for more efficient, precise and less tiresome operation by the user than with prior art input devices.

A wearable interface (Smart Phone) type device can be capable of performing marker place tracking and read user commands on and over, inputting track pad.

The tracker pad area can be designed to contain (have) a smaller representational representation pattern of the user desired display screen contents. The icons, tiles, images and the like, that the user intends to manipulate, click on, move, swipe, enlarge, reduce, maneuver, interact with etc., on the user's selected display screen(s). A dedicated portion of the touchscreen is for operable display, virtual keyboard options that are placed in reach and placement for interaction by user's thumb(s) and responds/detects reaction to location-based distortions of thumb movements/actions.

Required repetitive sequences that a user previously must endure can be eliminated, therefore enhancing the benefits of the devices user interface, with a thumb track pad function that also acts as an intermediary between the user commands and the functions fulfilled on screen(s), the thumb track pad area is able to accurately detect a new signal from the user and is able to respond appropriately with user desired control of functions.

A track pad with additional optical/sensing of user's assigned marker point(s) focusing images in the region in front and/or over the tracking pad sensor(s) for transforming the collected image points to electrical signals transferred to computing processor for returned display interaction promoting user command actions. The electrical signals are coded and assigned display actions showing user requested images and changes thereto. The identifying marker point on user's thumb(s)/finger(s) will move in tandem with finger movement and pressure(s) over and on the tracker pad equipped with sensing means.

A signal generator and/or receiver configured to generate a second response signal in accordance with a predetermined output response to reprogrammed computing processor thereby determining actions presented and displayed on desired display screen(s) while being worn by user.

A thumb track pad area, interface control apparatus can comprise: a movement sensor configured to identify marker point(s) on user's thumb(s)/finger(s) and the magnitude of movement on/or over tracker pad and for generating a specific identified marker point signal in response to the sensed magnitude of movement, the movement and pressure of sending marker(s) can be selected from or combined with e.g., Ink spot, identified finger print location spot, attached or applied simple(s), spot(s), reflector(s), stickers and the like. An identifier of a specific location on user(s) finger(s)/thumb(s), tip(s) pad(s) of the human being signal generation and/or signal receiving associated with such specific point locator for a sensor or a receiver.

Lining the outside perimeter of touch based tracker pad can be push button type switches aligned in set to be assigned functions and engaged, activated by user applying touch force against their top surfaces by thumb/finger tap inputs thereon.

Additionally, techniques and methods are provided for increasing the performance and efficiency of identification of finger worn markers through tracker pads of finger-tip pad, marker points when employed in conjunction with, ring-type, holder base and user input interface devices, designated track pad detection area.

A computer readable medium for particular tracker pad user interface with various image identification means to read markers on or about the user's finger tips(s) and/or other image processing techniques to find and identify specific tracker points on a user's finger tips, provides a seamless, dynamic, and intuitive experience for the user thereof, capturing data to detect and produce a select point, a pin point, on user's finger(s) tip(s) that are used for input movement instruction commands.

User Input, Devices—Mouse, Touch Sensitive, Track Pad Area

A delay in the movement of a cursor with a mouse type interface dragging or moving the cursor to the user desired point of contact to activate control with selected icon. An intermediary move of, or on, a mouse type interface of the cursor to the icon, window, tile etc. typically requiring user intervention in the form of a mouse click on an icon of interest, to view or control the program information. Such action and the icon, window, tile etc. can be eliminated. With disclosed devices, such selection and clicking can be accomplished by a small motion/movement of thumb on or above the thumb based, track pad interface.

Previous drawbacks can be eliminated and disclosed devices can provide a light weight portable, wearable computing device with input devices configured for single-hand use. The input device, track pad, acts as digital control and can be positioned in the immediate proximity of the user's thumb reach for an operator to control sequences which enables quick control of an appreciable number of operations with considerably reduced fatigue and effort while still allowing a user use of arms and allow mobility of user's finger while transporting the wearable device. The thumb placement marker locations movement parameters are detected and displayed on screen. Available methods and options of inputting in to the disclosed interface device may include one or more of the following approaches:

1. Single thumb movements on or over thumb-track pad screen interfaces.
2. Two thumb inputting on user selected style layout of keyboards on touch screen.
3. Single or multiple finger-tip inputting on touch screen.
4. Use of stylus on thumb-pad and/or touch screen(s).

A steady, reliable device platform, a ring type holder is provided that increases the user's capacity to organize, manage, control and access available information and user viewing options all controlled with small movements of user's thumb. These small movements on a small touch pad area can make large bold movements and control on the active user display screen(s) as a direct response pointing type cursor that can be actively controlled and commanded by said track pad actions.

A display screen can provide an element of a display signal generated used by user's thumb signal/marker point identified movements.

A control device can comprise a body which can be maintained in a substantially fixed position while in use or at rest on the user's hand worn on a finger of user's hand without immobilizing the user's fingers but still able to operate a plurality of technology performances supported by said body, each immediately available to user while wearing this technology.

Games

An apparatus can be played (with by/on a performer on by player) with the ring type holder providing a steady, mobile base offering vigorous movement inputting options. The device may be additionally designed to offer Augmented Reality gaming/viewing.

Keyboards

Presentation and function of keyboard layout designs, patterns and sizes can be improved compare to prior art devices, like keyboards. With a disclosed device, the user can also select from menu, keyboard layout pattern options or create their own keyboard layouts active areas and input positions locations as user desires and selects.

Display Screens and Cover Options

A thin flexible display screen can be integrated into disclosed devices to greatly enhance the form and functionality of the wearable user interface device.

The view screen(s) can include any combinations of text, graphic images, hyperlinks or any other visual views of displayed or hidden responsive icons and/or symbolizes and/or populated with wearying date type displays for user reference method of communication (example; voice, e-mails, text message(s), message content, tasks, task options and selection(s) etc. The view screen(s) are to be tied with audio and video visual (TV) as user selected and activated.

Display areas and/or attachments to/with the invention to be used with the user interface. As an example, the display, may provide a touch sensitive type interface surface, a surface allowing use to observe and select different applications and options within an application (e.g., to select an icon and view contents).

Adjustable display geometry characteristics of display(s) screen(s) correct for optical based viewing angle at which a user is viewing the finger wearable device in relationship from hand position to eyes position of user.

A main display screen, the touch pad and the "ring-type" holder base are mounted in an adjustable spaced relationship to engage the user's preferred finger position and size, the user's desired thumb reachable area to facilitate input functionality on the track pad, all adapted to have pivotal adjustable movement to be aligned to user's specific need and desires.

Phone Use

Some disclosed devices are capable of two-way and multiple connection communications, cellphone capabilities, e-mail, document transfers, video imputing/sending etc., commonly referenced to as "smart phone capabilities".

Control of Other Devices

An interface device can provides a controller configured to control multiple computers (sometimes referred to herein as a computing environment), over at least one computer network.

The presented interface with (ring-type base holder with thumb, tracker pad control) additionally may control many different devices, including, but not limited to Television turner/control box, entertainment centers, other hand held and desk top type devices, smart watches, smart glasses, remote display screens and the like. User interaction with a broad range of electronic devices can be unified, passing control signal(s) information and commands between host device and external device(s)

An ergonomic, wearable user interface device may include remote control transmissions to and from user selected capable electronic devices for control of their functions and applications thereof.

Health Check

A ring-type holder can include one or more sensor(s) situated within the ring type portion of the holder. Such a sensor(s) can be positioned so that the sensor(s) touch (make contact with) the skin when positioned on the user. The physical portion of the ring-type holder can have an inside surface that touches the skin of the user when being worn and one or more sensor(s) are positioned on the inside surface of the ring-type holder embodiment capable of sending data to the computing system for processing and display a multitude of graphics, text or any other visual data.

Embedded within the device are cameras, microphones, speakers, card reader/scanners, touch screens, touch pads, or switches/controls for operation and options of user communication.

A mobile device can be durable, waterproof and/or resistance, shock resistant, which may include internal and external cushioning, sealing, spacing, rounding edges, strong adhesives, protective covers and the like.

A sensitive antenna(s) sensor does not require aiming of the device and provides strong stable transmission and reception of wireless signals.

The exterior appearance can be customizable with interchangeable design attachments, providing additional options for industry and consumers by offering new shapes, sized and styles of wearable P.E.D.s that may include unique designs incorporating additional technology capabilities as they become available. A device can be personalized expanded for individual desired wants and needs.

A light weight portable, wearable computing device can have an input device configured to permit single-hand use.

Computing Environments

Figure 8:
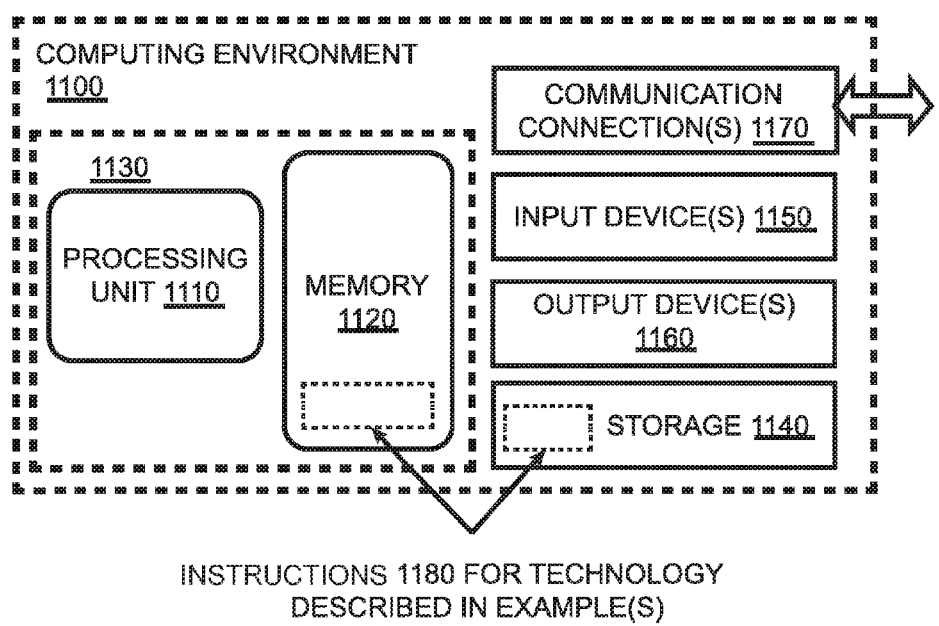
FIG. 8 is a block diagram of a computing environment of the type disclosed herein.

FIG. 8 illustrates a generalized example of a suitable computing environment 1100 in which described methods, embodiments, techniques, and technologies may be implemented. The computing environment 1100 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 8, the computing environment 1100 includes at least one central processing unit 1110 and memory 1120. In FIG. 8, this most basic configuration 1130 is included within a dashed line. The central processing unit 1110 executes computer-executable instructions and may be a real or a virtual processor. In a multi-processing system, multiple processing units execute computer-executable instructions to increase processing power and as such, multiple processors can be running simultaneously. The memory 1120 may be volatile memory (e.g., registers, cache, RAM), non-volatile memory (e.g., ROM, EEPROM, flash memory, etc.), or some combination of the two. The memory 1120 stores software 1180 that can, for example, implement one or more of the innovative technologies described herein. A computing environment may have additional features. For example, the computing environment 1100 includes storage 1140, one or more input devices 1150, one or more output devices 1160, and one or more communication connections 1170. An interconnection mechanism (not shown) such as a bus, a controller, or a network, interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, CD-RWs, DVDs, or any other medium which can be used to store information and which can be accessed within the computing environment 1100. The storage 1140 stores instructions 1180, which can cause an associated computing environment to implement one or more technologies described herein.

The input device(s) 1150 may be a touch input device, such as a keyboard, keypad, mouse, pen, or trackball, a voice input device, a scanning device, or another device, that provides input to the computing environment 1100. For audio, the input device(s) 1150 may be a sound card or similar device that accepts audio input in analog or digital form, or a CD-ROM reader that provides audio samples to the computing environment 1100. The output device(s) 1160 may be a display, printer, speaker, CD-writer, or another device that provides output from the computing environment 1100.

The communication connection(s) 1170 enable communication over a communication medium (e.g., a connecting network) to another computing entity. The communication medium conveys information such as computer-executable instructions, compressed graphics information, or other data in a modulated data signal. The data signal can include information pertaining to a physical parameter observed by a sensor or pertaining to a command issued by a controller, e.g., to invoke a change in an operation of a component in a corresponding system.

Computer-readable media are any available media that can be accessed within a computing environment 1100. By way of example, and not limitation, with the computing environment 1100, computer-readable media include memory 1120, storage 1140, communication media (not shown), and combinations of any of the above.

Additional details are found in the foregoing descriptions of the drawings and annotation reference lists and are not repeated in the section.

Other Exemplary Embodiments

The examples described above generally concern wearable devices and associated systems. Other embodiments than those described above in detail are contemplated based on the principles disclosed herein, together with any attendant changes in configurations of the respective apparatus described herein. Incorporating the principles disclosed herein, it is possible to provide a wide variety of modular systems configured to transfer heat. Moreover, systems disclosed above can be used in combination with other wearable device configurations and other many possible examples.

Apparatus, systems and methods for lightweight compact, portable, computing communications device, a Personal Electronic Device P.E.D. (Smart Phone) with wearable capability and may have retractable base ring type holder(s) with, thumb pad area user interface, for ergonomic single hand operation and mobility. The base ring type holder with thumb track pad area user interface includes marker location specific touch point tracking sensors and system linked to software technology to identify user source selected input point on user's thumb/finger to be identified and assigned, a consistent user identification "The Pin Point" in location to be used in conjunction with track pad area interface sensors, that allows for efficient functionality of user commands. Further disclosed is the methods and means for user selection and remote operation of any number of suitably configured electronic activated devices, examples include; Television, Entertainment systems, Gaming, Alarm Systems, Lighting adjustment, automatic entry, Heating/Air conditioning systems, Desk top, Lap top, tablet computers, other smart phones, electronic glasses, electronic watches and the like. Additional described embodiments of the invention include methods and means for user self-monitoring systems, with information obtained through sensors in and around the interior of ring type holder wearable by user, examples; User's blood pressure monitoring, Heart rate, Temperature, additional user Health and exercise performance and safety information, i.e. Distance user traveled (GPS) location and Route(s), Warnings, Notifications, Alerts provided to user through visual indications, Voice, Sound, Vibration and/or through e-mail(s), Social Media contacts, Phone calling to user selected per-authorized recipients initiated through device. Further disclosed is a platform holder Base with methods for user interface device providing display and communication interaction from a multitude of information sources. Specifically, a user interface device that is wearable on user finger(s) and provides for single hand operation/transport options. In one general aspect, a wearable computing device can include a base portion with, ring type holder, that may include display screen(s) attached and/or attachable, the display screen(s) may include touch screen with virtual keyboard for inputting, and/or track pad area, more specifically receptive to user thumb movement tracking of specifiable, marker point, location on user's thumb/finger(s) as it moves over and on the sensors in, on and or around track pad designated area. The display screen (s) can have a portion coupled to the base, ring type holder, portion via a hinge providing multiple user angles selected positions. The display screen(s) and/or touch pad portion can be configured to rotate about an axis using a pivot point, type, hinge(s) attachable to, ring type, holder base. The bottom portion of the display screen(s) and/or the touch pad can be configured to be slide-able, to move along a guide over the top portion of the ring-type holder in a translational direction orthogonal to the axis thereof. The ring type holder can be adjustable, expandable to accommodate user needs. The ring-type base, holder may be collapsible to lay flat against the bottom surface of display screen(s) case, possibly along a guide opening. The adjustable, ring type, holder may be pulled forward and out to adjust to user's selected finger size and then pushed back to tighten or lay flat when not in use. This offers user different orientations of the hardware. This disclosure relates to a computer communication interface device, and more particularly but not exclusively to a easily transportable personal technology device, wearable on user's finger(s) with input control options through movements on (thumb) track pad area sensor screen, that emulates the operation of direct response computer mouse, thus, user desired contents can be manipulated and shown on attached/attachable and/or remote display screen(s). Furthermore this disclosure permits adaptions for single hand support, operator use, and function.

Directions and references (e.g., up, down, top, bottom, left, right, rearward, forward, etc.) may be used to facilitate discussion of the drawings but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by references in its entirety for all purposes.

The principles described above in connection with any particular example can be combined with the principles described in connection with any one or more of the other examples. Accordingly, this detailed description shall not be construed in a limiting sense, and following a review of this disclosure, those of ordinary skill in the art will appreciate the wide variety of wearable device configurations and associated systems that can be devised using the various concepts described herein. Moreover, those of ordinary skill in the art will appreciate that the exemplary embodiments disclosed herein can be adapted to various configurations without departing from the disclosed principles.

The previous description of the disclosed embodiments is provided to enable any person skilled in the art to make or use the disclosed innovations. Various modifications to those embodiments will be readily apparent to those skilled in the art, and the generic principles defined herein may be applied to other embodiments without departing from the spirit or scope of this disclosure. Thus, the claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

Thus, in view of the many possible embodiments to which the disclosed principles can be applied, it should be recognized that the above-described embodiments are only examples and should not be taken as limiting in scope. I therefore reserve all rights to the subject matter disclosed herein, including the right to claim all that comes within the scope and spirit of the following claims.

I currently claim:

1. A finger-wearable computing device comprising:
a processor;
a resiliently flexible ring base, configured to be worn on a finger of a wearer's hand, wherein the resiliently flexible ring base defines an overlapping loop with a central opening that expands and contracts to fit the finger of the wearer's hand, and wherein the processor is housed within the resiliently flexible ring base; and
a display screen coupled to the resiliently flexible ring base and coupled to the processor to display an output, wherein the display screen includes a command area configured to receive user input from a thumb of the wearer's hand while the finger-wearable computing device is worn on the finger of the wearer's hand;
wherein the resiliently flexible ring base includes a first end and a second end opposite the first end along a length of the resiliently flexible ring base, wherein the resiliently flexible ring base includes a finger-engagement portion at the first end, extending along the length toward the second end, and includes a display portion along the length between the finger-engagement portion and the second end, wherein the display screen is housed within the display portion of the resiliently flexible ring base, and wherein the command area of the display screen is distal from the second end; and wherein the overlapping loop of the resiliently flexible ring base includes an open release area adjacent to the first end of the resiliently flexible ring base and the display portion of the resiliently flexible ring base extends across the open release area and over the first end of the resiliently flexible ring base when the finger-wearable computing device is worn on the finger of the wearer's hand.

2. The finger-wearable computing device of claim 1, wherein the command area of the display screen corresponds to an area reachable by the thumb while the finger-wearable computing device is worn on the finger.

3. The finger-wearable computing device of claim 1, further comprising a user control button coupled to the resiliently flexible ring base and positioned at an edge of the command area of the display screen.

4. The finger-wearable computing device of claim 1, further comprising a wireless transceiver configured to control a remote electronic device.

5. The finger-wearable computing device of claim 4, wherein the remote electronic device is one or more of an augmented reality device, a gaming device, a remote interactive display, and electronic glasses.

6. The finger-wearable computing device of claim 1, wherein the display screen is resiliently flexible.

7. The finger-wearable computing device of claim 1, wherein the command area of the display screen is positioned to overlie the finger of the wearer's hand when the finger-wearable computing device is worn on the finger of the wearer's hand.

8. The finger-wearable computing device of claim 1, wherein the display screen includes an active area that is configured to display images and wherein the command area is a portion of the active area.

9. The finger-wearable computing device of claim 1, wherein the resiliently flexible ring base includes a ring conformation in which the finger-engagement portion defines the central opening to fit the finger of the wearer's hand and includes a flat conformation in which the display portion and the finger-engagement portion are folded flat together.

10. The finger-wearable computing device of claim 1, further comprising a detachable display that is coupled to the processor to display a primary output, wherein the detachable display is mechanically coupled to the resiliently flexible ring base by a pivotal coupler configured to pivot the detachable display between an open position in which the primary output on the detachable display and the output on the display screen are viewable by the wearer while the finger-wearable computing device is worn on the finger of the wearer's hand and a closed position in which the detachable display overlies the resiliently flexible ring base.

11. The finger-wearable computing device of claim 1, further comprising an interface device configured to communicate over a computer network.

12. A finger-wearable computing device comprising:
a processor;
a ring base, configured to be worn on a finger of a wearer's hand, wherein the ring base defines a central opening to fit the finger of the wearer's hand along a central axis of the central opening, wherein the processor is housed within the ring base; and
a display screen pivotally coupled to the ring base and coupled to the processor to display an output, wherein the display screen includes a command area configured to receive user input from a thumb of the wearer's hand while the finger-wearable computing device is worn on the finger of the wearer's hand;

wherein the display screen is configured to pivot about a hinge between an open position in which the output on the display screen is viewable by the wearer and a closed position in which the display screen overlies the ring base, wherein the hinge is generally parallel to the central axis of the central opening of the ring base and wherein when the display screen is in the open position the display screen has a vertical axis that is canted at an angle relative to the central axis of the central opening of the ring base to ergonomically position the display screen while the finger-wearable computing device is worn on the finger of the wearer's hand.

13. The finger-wearable computing device of claim 12, wherein the display screen is resiliently flexible and configured to conform to the ring base in the closed position.

14. The finger-wearable computing device of claim 12, wherein the finger is an index finger, wherein the display screen has a rectangular profile with at least one notched corner that is positioned to permit the finger-wearable computing device to be worn on a middle phalanx of the index finger without causing the display screen to impinge into a proximal phalanx of the index finger.

15. The finger-wearable computing device of claim 12, further comprising a user control button coupled to the ring base and positioned at an edge of the command area of the display screen.

16. The finger-wearable computing device of claim 12, further comprising a wireless transceiver configured to control a remote electronic device.

17. The finger-wearable computing device of claim 16, wherein the remote electronic device is one or more of an augmented reality device, a gaming device, a remote interactive display, and electronic glasses.

18. The finger-wearable computing device of claim 12, wherein the command area of the display screen is positioned to overlie the finger of the wearer's hand when the finger-wearable computing device is worn on the finger of the wearer's hand.

19. The finger-wearable computing device of claim 12, wherein the display screen includes an active area that is configured to display images and wherein the command area is a portion of the active area.

20. The finger-wearable computing device of claim 12, wherein the display screen comprises a first microphone-speaker and a second microphone-speaker at opposite ends of the display screen, wherein the first microphone-speaker is at a first end of the display screen, when worn on a wearer's left hand, that is toward a proximal end of a wearer's left index finger and, when worn on a wearer's right hand, that is toward a distal end of a wearer's right index finger, wherein the second microphone-speaker is at a second end of the display screen, when worn on the wearer's left hand, that is toward a distal end of the wearer's left index finger and, when worn on the wearer's right hand, that is toward a proximal end of the wearer's right index finger, and wherein the processor is configured to operate the first microphone-speaker as a microphone and the second microphone-speaker as a speaker when the finger-wearable computing device is worn on the wearer's left hand for up-to-the-ear phone use, and is configured to operate the first microphone-speaker as a speaker and the second microphone-speaker as a microphone when the finger-wearable computing device is worn on the wearer's right hand for up-to-the-ear phone use.

21. The finger-wearable computing device of claim 20, further comprising a directional sensor configured to determine which of the first microphone-speaker and the second-microphone-speaker is positioned upward.

22. The finger-wearable computing device of claim 12, further comprising a transceiver configured for cellular telephone communication.

23. A finger-wearable computing device comprising:
a processor;
a resiliently flexible ring base, configured to be worn on a finger of a wearer's hand, wherein the resiliently flexible ring base defines an overlapping loop with a central opening that expands and contracts to fit the finger of the wearer's hand, and wherein the processor is housed within the resiliently flexible ring base;
a display screen coupled to the resiliently flexible ring base and coupled to the processor to display an output, wherein the display screen includes a command area configured to receive user input from a thumb of the wearer's hand while the finger-wearable computing device is worn on the finger of the wearer's hand; and
a detachable display that is coupled to the processor to display a primary output, wherein the detachable display is mechanically coupled to the resiliently flexible ring base by a pivotal coupler configured to pivot the detachable display between an open position in which the primary output on the detachable display and the output on the display screen are viewable by the wearer while the finger-wearable computing device is worn on the finger of the wearer's hand and a closed position in which the detachable display overlies the resiliently flexible ring base;
wherein the resiliently flexible ring base includes a first end and a second end opposite the first end along a length of the resiliently flexible ring base, wherein the resiliently flexible ring base includes a finger-engagement portion at the first end, extending along the length toward the second end, and includes a display portion along the length between the finger-engagement portion and the second end, wherein the display screen is housed within the display portion of the resiliently flexible ring base, and wherein the command area of the display screen is distal from the second end.

* * * * *